US008463636B2

(12) United States Patent
Ahsan et al.

(10) Patent No.: US 8,463,636 B2
(45) Date of Patent: Jun. 11, 2013

(54) FIELD SERVICING

(75) Inventors: Mohammad K. Ahsan, Eden Prairie, MN (US); Mynul H. Khan, St. Cloud, MN (US)

(73) Assignee: Field Nation, LLC, Minneapolis, MN (US)

( * ) Notice: Subject to any disclaimer, the term of this patent is extended or adjusted under 35 U.S.C. 154(b) by 1468 days.

(21) Appl. No.: 11/413,291

(22) Filed: Apr. 28, 2006

(65) Prior Publication Data
US 2007/0251988 A1  Nov. 1, 2007

(51) Int. Cl.
G06Q 10/00 (2006.01)

(52) U.S. Cl.
USPC .......................... 705/7.14; 705/7.16; 705/321

(58) Field of Classification Search
USPC ............................ 705/1.1, 7.14, 7.16, 80, 321
See application file for complete search history.

(56) References Cited

U.S. PATENT DOCUMENTS

| | | | | |
|---|---|---|---|---|
| 5,602,982 | A * | 2/1997 | Judd et al. | 715/709 |
| 5,720,007 | A * | 2/1998 | Hekmatpour | 706/50 |
| 5,953,706 | A * | 9/1999 | Patel | 705/6 |
| 6,370,562 | B2 | 4/2002 | Page et al. | |
| RE38,633 | E | 10/2004 | Srinivasan | |
| 7,401,025 | B1 * | 7/2008 | Lokitz | 705/346 |
| 7,856,406 | B2 | 12/2010 | Leventhal | |
| 2001/0013004 | A1 * | 8/2001 | Haris et al. | 705/1 |
| 2001/0025267 | A1 | 9/2001 | Janiszewski | |
| 2001/0049658 | A1 * | 12/2001 | Hays | 705/40 |
| 2001/0051913 | A1 * | 12/2001 | Vashistha et al. | 705/37 |
| 2002/0029161 | A1 * | 3/2002 | Brodersen et al. | 705/9 |
| 2002/0147708 | A1 | 10/2002 | Thomas et al. | |
| 2003/0005124 | A1 * | 1/2003 | Hollinger et al. | 709/226 |
| 2003/0171927 | A1 * | 9/2003 | Bernard | 704/273 |
| 2003/0225683 | A1 | 12/2003 | Hill et al. | |
| 2004/0098400 | A1 * | 5/2004 | Landau et al. | 707/100 |
| 2004/0193533 | A1 | 9/2004 | Chang et al. | |
| 2005/0289039 | A1 * | 12/2005 | Greak | 705/37 |
| 2006/0224490 | A1 * | 10/2006 | Seth et al. | 705/37 |
| 2008/0120210 | A1 | 5/2008 | Leventhal | |
| 2008/0162249 | A1 | 7/2008 | Leventhal | |

OTHER PUBLICATIONS www.T6Driver.com, Internet Archive Web Page dated Feb. 23, 2006, <http://web.archive.org/web/20060223101049/http://t6driver.com/jsupt_academics.html>, accessed Jun. 6, 2012.*
Rollouts Incorporated, The Rollouts Solution, http://www.rollouts.com/WhyRollouts.htm, pp. 1-6.
Onforce, Your Real Time Marketplace for On-Site IT Service, http://www.onforce.com, pp. 1-3.

* cited by examiner

*Primary Examiner* — Scott A Mattia
(74) *Attorney, Agent, or Firm* — Brooks, Cameron & Huebsch, PLLC

(57) ABSTRACT

Systems, computer-readable media, and methods are presented for selecting a service entity that utilize a processor, a memory connected to the processor, and program instructions storable in the memory and executable by the processor. Program instructions can execute to receive information from a first entity regarding a particular set of attributes of a second entity, a set of services to be performed by the second entity, and a predetermined compensation for the services. Program instructions can execute to transmit a communication to a second entity that contains the particular set of attributes, the set of services to be performed, and the predetermined compensation. Program instructions can execute to identify a number of second entities to perform the set of services by matching a number of the particular set of attributes received from the first entity. Additionally, program instructions can execute to receive a selection from the first entity of at least one of the number of second entities.

16 Claims, 18 Drawing Sheets

500

Admin / Project Management / Project Details / Edit Project

New CenturyTek Project:

Project Manager: [Barbara Cordes ▼] ~510

Project Name: [new project] ~520

Project Description:
[some description] ~530

Project Start Date: Month [May ▼] Day [2 ▼] Year [2006 ▼]  ⎫
                                                                ⎬ 540
Project End Date: Month [July ▼] Day [2 ▼] Year [2006 ▼]   ⎭

The following will be the default values for each site and every technician that works on the project. These value can be changed for each site and each technician.

Site Start Time: [8 ▼] [00 ▼] [PM ▼]  ⎫
                                           ⎬ 551
Site End Time: [10 ▼] [00 ▼] [PM ▼]   ⎭

Technician Pay Rate: $[50.00] ~552
Pay Per: [Site ▼] ~553
Number of Devices: [0] ~554
Average Time to Complete: [2.00] ~556
Allow Uploads: [Yes ▼] ~557

⎫
⎬ 550
⎭

Email Alerts
When this project and it's sites are published would you like to send an email alert to all technicians in each sites area? This value will be the default for each site in this project.

[No ▼] ~563

If so, how many miles from each site (radius) would you like to email to? Up to 200 miles. [0] miles ~567

⎫
⎬ 560
⎭

[Update Project] ~569

Site Technician(s): 1 tech(s) have requested this site   view techs requesting this site

| Tech Position | Tech Name | Backup(s) Selected | Tech(s) Confirmed | Backup(s) Confirmed | Hours billed | Tech Confirmed | Work Approved | Tech Paid | Tech Rated |
|---|---|---|---|---|---|---|---|---|---|
| Primary Tech 1: | Tom Anderson | n/a | Confirmed | | 3 | | Approved | No | Rate |
| Backup Tech 1: | | | Not Confirmed | | | | | | |
| Primary Tech 2: | n/a | n/a | Not Confirmed | | 0 | | Incomplete | No | Incomplete |
| Backup Tech 2: | | | Not Confirmed | | | | | | |

Site Status

| Tech(s) Selected | Backup(s) Selected | Tech(s) Confirmed | Backup(s) Confirmed | Site Complete | Total Hours Billed | Approved | Tech(s) Rated | Tech(s) Paid |
|---|---|---|---|---|---|---|---|---|
| 1 out of 2 | 0 out of 2 | 1 out of 2 | 0 out of 2 | No | 3 | 1 out of 2 | 0 out of 2 | 0 out of 2 |

Extra Data Fields show/hide extra data

Site Comments

Comment from: Mynul Khan - 04/13/2006 7:18am CDT
No more instructions
Shown To Tech Comment from: Mynul Khan - 04/13/2006 7:17am CDT
I have another instruction for you.
Shown To Tech Comment from: Mynul Khan - 04/12/2006 4:22pm CDT
this is a new instruction for you.

Add Comment

Uploaded Files (1) show/hide

My Sites

| Position | Project Name | Site City | State | Zip | Start Date | Status | Confirm | Details | Release |
|---|---|---|---|---|---|---|---|---|---|
| N/A | Service Call | Pago Pago | AS | 96799 | 04/11/2006 | Complete | confirm | Details | |
| Primary 1 | new project | some city | AS | 96799 | 05/02/2006 | Published | Confirmed | Details | release |

↑ 1212  ↑ 1214  ↑ 1216

Requested Sites

| Project Name | City | State | Zip | Start Date | Requested Date | Primary | Selected | Backup | Selected | Details |
|---|---|---|---|---|---|---|---|---|---|---|
| You have not requested any sites. | | | | | | | | | | |

Available Sites

| Project Name | City | State | Zip | Start Date | # Techs | Details |
|---|---|---|---|---|---|---|
| Test Project 1 | Pago Pago | AS | 96799 | 03/31/2006 | 1 | Details |

1210 — My Sites
1220 — Requested Sites
1230 — Available Sites
1200

Marketplace/Site Details — 1300, 1310

- Company Name: CenturyTek
- Project Name: Service Call
- Status: Complete
- Work Order #: 1000001
- Address 1: 123 State Street
- Address 2:
- City: Pago Pago
- State: AS
- Zip: 96799
- Contact Name:
- Contact Phone: 123-456-7890
- Pay Rate: $50.00
- Pay Per: Device
- Number of Devices: 4
- Est. Time: 2.00 hours
- Start Date: 04/11/2006
- Completed Date: 04/11/2006
- Description: This is a description You have been chosen for this site — 1320

Work Order Comments — 1330

Comment from Tom Anderon - 04/11/2006
This is a test comment to the technician.

Comment from Tom Anderson - 04/11/2006
test

Comment from Tom Anderson - 04/11/2006
test

Comment from Tom Anderson - 04/11/2006
test

Add Comment

Files: — 1340
265_Michael.jpg
upload file

Your Actual Time: — 1350

| Date | Hours |
|---|---|
| 04/11/2006 | 2.00 |

Work Approved: This work has been approved — 1360
Payment Made: Payment has not been made for this work — 1370

1400

Job Name: Service Call Positions ← 1410

Company: Major OEM ← 1420

Job Overview: ← 1432
GENERAL OVERVIEW OF THE SERVICE CALL POSITION
We are seeking Techs for an ongoing Service Call project taking place in several cities across the US. This position does require some technical knowledge, as you will be replacing defective parts dealing with primarily POS equipment at retail stores (keyboards, cash drawers, check readers, monitors, etc).

You will have the flexibility of taking or turning down any Service Calls.

CURRENTLY SEEKING TECHS FOR THE FOLLOWING AREAS:

Albany, NY
Atlanta, GA
Baltimore, MD
Boston, MA
Chicago, IL
Cincinnati, OH
Colorado Springs, CO
Detroit, MI
Hartford, CT
Los Angeles, CA
Manchester, NH
New Orleans, LA
New York, NY
Newark, NJ
Newburgh, NY
Orlando, FL
Philadelphia, PA
Phoenix, AZ
Portland, ME
Providence, RI
San Francisco, CA
Seattle, WA
Springfield, IL
St. Louis, MO
Toledo, OH
Washington, DC

1434

Note: We will likely be seeking Techs for additional cities in the near future. If you are not interested in any of the cities listed above, you should still register, which will let us know that you are interested in a "Future City" if/when it is added.

1436

PAYMENT/FREQUENCY OF WORK:
Each service call pays $40.00, which will take no more than 2 hours total on average, including drive time. It's difficult to forecast the number of calls per city but that number is expected to continually increase with time. One tech will likely not get all of the calls. What techs receive, what calls, will depend on a number of variables such as tech geography, reliability, technical experience, who answers the Service Call alerts first, etc.

TRAINING & START DATE:

Training: It is your responsibility to follow the necessary steps on the Flex web site and let us know once you are ready to get on a "Q & A Teleconference".

1438

There is really no "technical training" for this project/position. We assume that you are technical enough to work this project or you won't continue. Your task will be fairly straight forward involving simple part replacement on POS equipment at retail/grocery store chains. There will be telephone support available to you for guidance on POS components of which you are not familiar.

Project start date: While this project started back in June 2005, it runs indefinitely and is constantly expanding. Therefore, Techs are continually encouraged to register.

Apply ← 1440                                                                                     Back

Marketplace / Site Details

1510 {
- Company Name: CenturyTek
- Project Name: Test Project 1

1520 {
- Site Name: Test Site 61
- Status: Published
- Site ID Number: TEST61
- Site Work Order Number: WO1000061
- Site Description:
  This is a description for Site Test 61

1530 {
Technician Schedule and Pay Information:

Tech Number 1

| 03/31/2006 | 1 | 7:00AM | To: | 8:00AM |

- Pay Rate: $25.00
- Pay Per: Hour
- Number of Devices: 0
- Estimated Time to Complete: 1:00 Hours 1540 — [Request this site]

| Rate Tom Anderson |
| --- |

Technician Rating Form

Work Order (optional) [_____] ~1610

Professionalism [Average ▼]
Attitude [Average ▼]
Details [Average ▼]
Availability [Average ▼]
Responsiveness [Average ▼]
Will Travel [Average ▼] } 1620
Aptitude [Average ▼]
Instructions [Average ▼]
Communications [Average ▼]
Experience [Average ▼]
Public Relations [Average ▼]

Comment [_____] } 1630

1640 — [rate] [Back]

*Fig. 16*

FIELD SERVICING

BACKGROUND

Many manufacturers and project managers are familiar with the cost of finding and contracting for technically skilled people to install and/or service products for their customers in a particular locale. For example, large-scale manufacturers often hire project management companies to find technicians, such as those operating as independent contractors, in the locales requiring field servicing of equipment.

For purposes of this discussion, the manufacturer level can be described as tier 1, and the project manager level described as tier 2. The regional, statewide, and municipal contractors and management companies can be described as tiers 3 through 5, serving as intermediaries in the search for a desired technician, who can be described as tier 6 in this example.

In such instances, project management may be handled by a company having nation-wide scope, for example, such companies having the ability to delegate the search for skilled technicians to successive tiers having, for example, regional, statewide, and/or municipal expertise in finding available technicians for field servicing the tier 1 manufacturer's equipment. Each of tiers 2 through 5 in this search potentially can be paid for doing so, which can contribute to the expense in finding a field service technician with the appropriate skills.

In a time of frugal investments in technology, for example, manufacturers may desire to reduce the expense of installing and servicing products, to which the expense of searching for technically skilled and experienced local contractors may significantly contribute.

BRIEF DESCRIPTION OF THE DRAWINGS

FIG. 5 illustrates another embodiment of a viewable interface that includes sources of information accessible to administrators and project managers according to the present disclosure.

FIG. 6 illustrates another embodiment of a viewable interface that includes sources of information accessible to administrators and project managers according to the present disclosure.

FIGS. 7A-7B illustrate embodiments of viewable interfaces that include sources of information accessible to administrators and project managers relating to selection of technicians according to the present disclosure.

FIG. 8 illustrates an embodiment of a viewable interface that includes sources of information accessible to administrators and/or project managers according to the present disclosure.

FIG. 11 illustrates another embodiment of a viewable interface that includes sources of information accessible to administrators and service call managers according to the present disclosure.

FIG. 12 illustrates an embodiment of a viewable interface that includes sources of information about projects and service calls that is accessible to technicians according to the present disclosure.

FIG. 13 illustrates an embodiment of a viewable interface that includes sources of information about a service call that is accessible to technicians according to the present disclosure.

FIG. 14 illustrates an embodiment of a viewable interface that includes sources of information about a number of service call positions that is accessible to technicians according to the present disclosure.

FIG. 15 illustrates an embodiment of a viewable interface that includes sources of information about a particular work site that is accessible to technicians according to the present disclosure.

FIG. 16 illustrates an embodiment of a viewable interface that includes sources of information about rating of technician characteristics that is accessible to project managers, service call managers, technicians, and service recipients according to the present disclosure.

DETAILED DESCRIPTION

Figure 1:
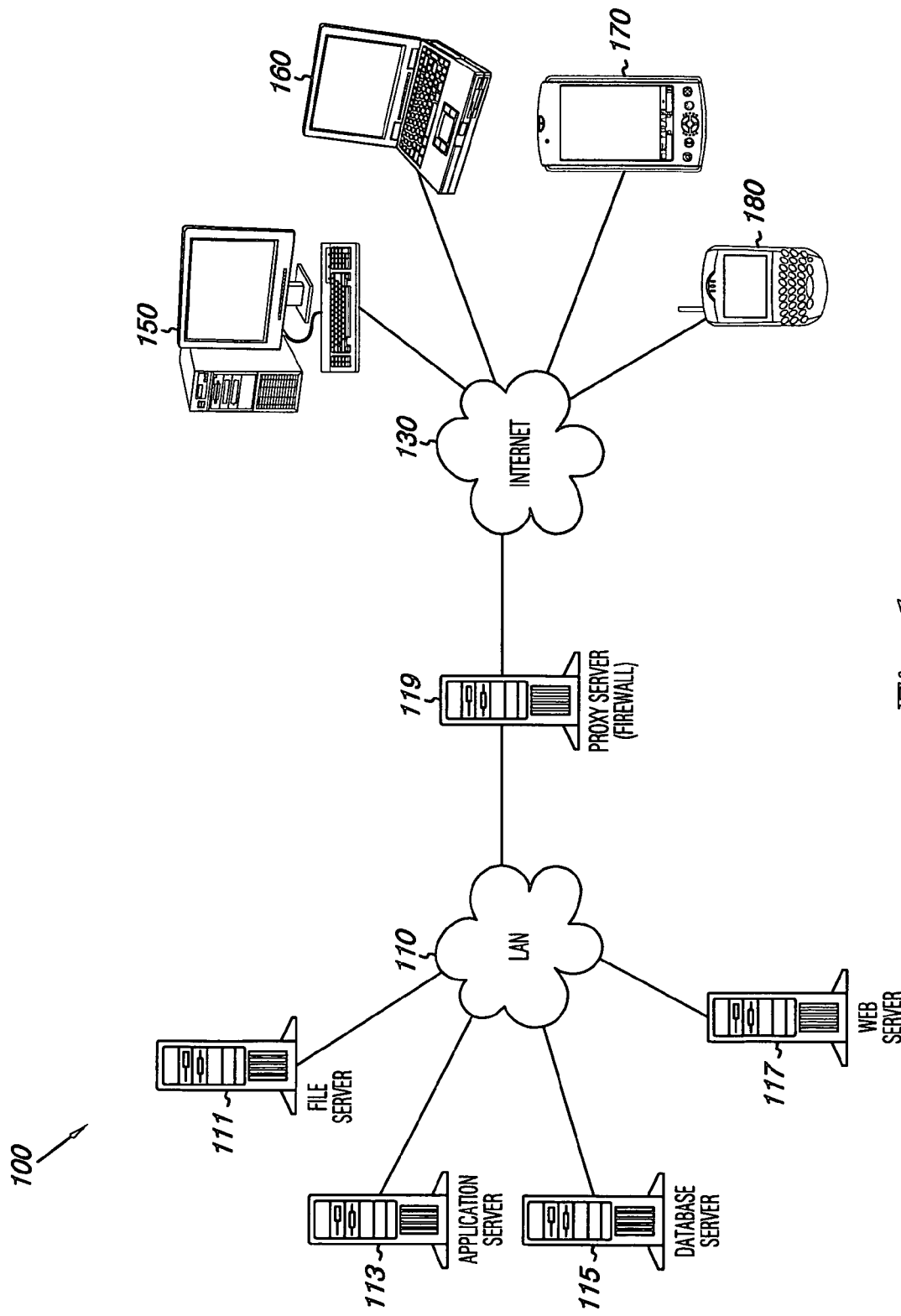
FIG. 1 illustrates an embodiment of a computing network system according to the present disclosure.

Embodiments of the present disclosure include systems and devices including computer-readable media, and having executable instructions for performing methods for coordinating technicians, e.g., tier 5 and lower second entities, for installing and servicing equipment provided by a tier 1 or tier 2 first entities, e.g., an original equipment manufacturer (OEM) and/or a high level project management entity. For purposes of the present disclosure, a field service can be described as installation and/or servicing by a technician (e.g., a tier 5 and lower second entity) that is not an employee of the first entity (e.g., the technician is an independent contractor) of equipment provided by the tier 1 or tier 2 first entity, such installation and/or servicing being performed in a locale not on the premises of the first entity.

In some embodiments of the present disclosure, program instructions storable in a memory and executable by a processor can be used to receive information from a first entity regarding a particular set of attributes of a second entity, a set of services to be performed by the second entity, and/or a predetermined compensation for the services. The program instructions can further be used to transmit a communication to a second entity that contains the particular set of attributes, the set of services to be performed, and/or the predetermined compensation. The program instructions can further be used to identify a number of second entities to perform the set of services by matching a number of the particular set of attributes received from the first entity. In addition, the program instructions can be used to receive a selection from the first entity of at least one of the number of second entities.

Some embodiments of the present disclosure can allow a first entity organization to directly contact a second entity by bypassing involvement of a number of intermediate tiers in arranging for contracting, designating and/or authorizing performance of services by second entities, for example, individual technicians to perform field service in particular locales. These technicians typically are positioned at tier 5 and lower in a service search hierarchy. By allowing a person within the first entity to function as a project manager conducting the search for a technician, or technicians, to perform a field service, considerable expense can be averted by retaining funds that would otherwise have been spent in compensating intermediate tiers for search efforts. In addition, allowing the person within the first entity to function as the project manager enables more direct monitoring of field services performed with regard to installation and/or servicing of OEM equipment.

By a tier 1 or tier 2 entity directly contacting tier 5 and lower entities to perform a field service with a predetermined compensation for completion thereof, the practice of higher tier entities receiving bids for performance of services can be reduced. Reducing bidding can allow the higher tier entity to have greater control of compensation for services provided, especially by technicians operating as independent contractors and performing field services in locales that are outside the direct purview of the higher entity (e.g., a tier 1 level manufacturer and/or a tier 2 level project manager). Moreover, by establishing a schedule in advance that can be accepted by the tier 5 and lower entity, the higher entity can determine timing of field service performance, rather than availability of tier 5 and lower entities.

By reducing the financial outlay incurred during the search for a qualified technician, a selected technician potentially can be awarded a higher predetermined compensation for the field service. Moreover, direct contact between a first entity and the second entity who receives high ratings for work performance in the field can engender loyalty between the two entities, which can result in repeat use of a particular technician by the first entity, which the presence of multiple intermediate tiers may have prevented.

Thus, utilizing particular embodiments of the systems, computer-readable media, and methods disclosed herein can benefit a first entity (e.g., OEMs and/or high level project managers) by reducing expenses incurred during a search for a technician qualified to perform specified field services. Utilizing such embodiments can benefit second entities by, for example, allowing them to seek contracts in their vicinity and/or field of expertise, allowing particular technicians to become individually known to contracting parties, and/or potentially allowing selected technicians to be awarded increased compensation for services rendered.

FIG. 1 illustrates an embodiment of a computing network system 100 according to the present disclosure. The system of FIG. 1 illustrates a computing network 100 suitable for implementing various embodiments of the present disclosure. A number of network devices (e.g., personal computers, servers, computing peripherals, etc.) can be networked together via a local area network (LAN) or via other kinds of networks. The embodiment of FIG. 1, for example, illustrates a number of servers networked together through the LAN 110.

The embodiment 100 of FIG. 1 includes a number of servers connected together through the LAN 110. The servers of the illustrated system include a file server 111, an application server 113, a database server 115, a web server 117, and a proxy server 119. The network can also include various other servers and/or devices.

In the embodiment 100 of FIG. 1, a file server 111 can be used to store various files. Program instructions, for example, provided on the file server 111 can execute to provide access to those files through the LAN 110. An application server 113 can be used to store various program applications with various program instructions, e.g., computer executable instructions. These instructions can be executed over the LAN 110. A database server 115 can be provided to store various databases. Program instructions on the server 115 can be executed to provide access to those databases through the LAN 110. For example, the database server 115 can store a database with project management and technician information from various sources including, product manufacturers, project managers, and technicians, among others as described herein.

Program instructions on a web server 117 can be executed to provide various services associated with the Internet's World Wide Web. For example, program instructions on the web server 117 can be executed to provide access to one or more web pages on an Internet website that can provide access to information that can be used to determine appropriate individual technicians that may be qualified to perform field servicing of equipment designated for particular projects and/or service calls. In such embodiments, the information on the website can be displayed in various information and input fields. Such fields, for example, can be adjusted to implement a strategy suitable to the desires of a tier 1 entity, e.g., a manufacturer or a designated project management organization, as described subsequently. A proxy server 119 can connect the LAN 110 to the Internet 130. The proxy server 119 also can serve as a firewall between LAN 110 and the Internet 130.

A number of devices capable of receiving and/or transmitting communication can also connect to the Internet 130. The embodiment 100 of FIG. 1 includes electronic communication devices 150, 160, 170, and 180, which are presented by way of example and not by way of limitation. The electronic communication devices 150 through 180 can connect to the Internet 130 in various ways, such as through dial-up connections, cable lines, DSL lines, through other networks, etc. Moreover, the communication can be performed by sending information using digital and/or analog landline and/or mobile telephone technologies, and/or radio technology, and/or electronic messaging technology, and/or fiber optic technology. The communication also can be provided by intranet and internet communications that utilize modem, cable, wireless, and/or satellite technologies.

The examples illustrated in FIG. 1 represent a desktop computing device 150, a laptop computing device 160, a personal digital assistant (PDA) device 170, and a mobile telephone capable of text messaging 180. These electronic communication devices can access and transmit various types of information, such as information on one or more web pages via the Internet 130 and/or textual and/or audio information, which by way of example, and not by way of limitation, can be transmitted via electronic messaging using an e-mail to a computing device, an e-mail to a wireless PDA device (e.g., BlackBerry, Trio, etc.), a text message, a fax blast, a voice blast, a voice broadcast, etc. The electronic communication devices can be located in various locations (e.g., homes, businesses, work sites, etc.) and/or can be portable.

Figure 2:
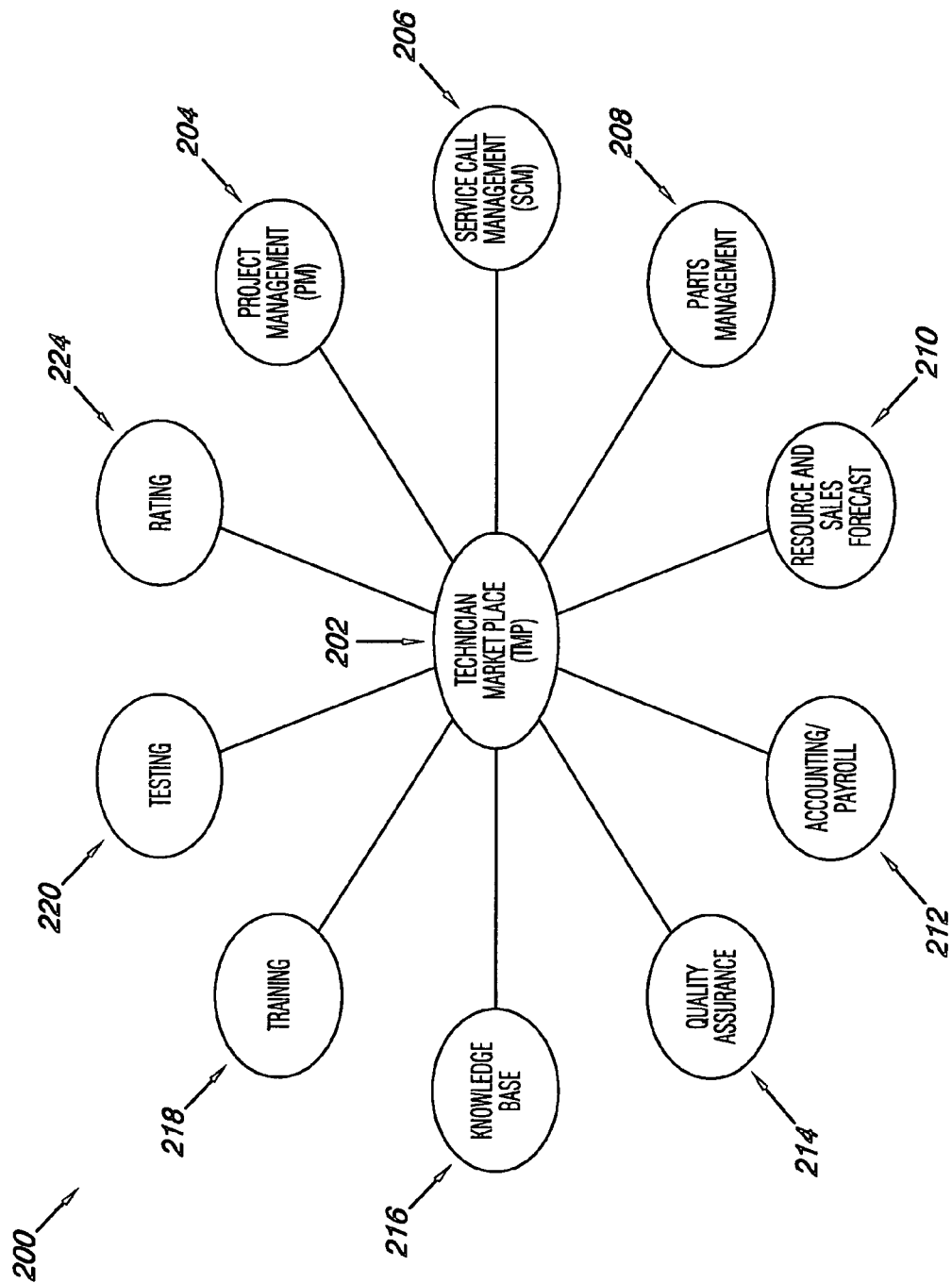
FIG. 2 illustrates an embodiment of an architectural representation in which a number of program modules can be accessed through a particular program access point according to the present disclosure.

FIG. 2 illustrates an embodiment of an architectural representation 200 in which a number of program modules, including executable instructions to perform certain tasks, can be accessed through a particular program access point 202, e.g., technician market place (TMP), available to various users through an application interface, according to the present disclosure. Technicians (e.g., tier 5 and lower entities) can be referred to in this disclosure as users and/or "second" entities (e.g., tier 5 and lower entities). Additionally, in this disclosure, higher entities (e.g., tier 1 and/or tier 2 entities) can be referred to as users and/or "first" entities. FIG. 2 illustrates an architectural embodiment 200 by which various resources, e.g., program modules 204-224, are accessed through the program access point 202. As the reader will appreciate upon reading this disclosure, a user may access the program access point 202 either internal to a particular LAN, e.g., LAN 110 described in FIG. 1, or externally over a broader communications network, e.g., via the Internet 130 described in FIG. 1 using communication and/or computing devices, e.g., devices 150-180 in FIG. 1. The number of program modules, 204-224, may be located in one or more locations, such as in a distributed server environment. Hence, all or part of the executable instructions associated with the program modules 204-224 described herein may be located on one or more servers, e.g., servers 111-117 described in connection with FIG. 1. The program modules 204-224 may be accessed via one or more application interfaces associated with the TMP program access point 202 from the number of communication and/or computing devices.

The program access point 202 can include access to various computer readable medium for storing a number of user files associated with individual technicians, e.g., technicians. For example, the program access point 202 can provide access to a database server, e.g., database server 115 in FIG. 1. In various embodiments, program instructions associated with the program access point 202 can execute to assist in fulfilling field service requirements through one or more servers and one or more application interfaces. That is, program instructions associated with the program access point can execute to allow controlled access to a data store of user files containing information descriptive of particular attributes associated with a particular technician, e.g., an individual technician.

A number of embodiments provide a resource for technicians (e.g., tier 5 and lower entities) to make their availability known to higher entities (e.g., tier 1 and/or tier 2 entities) seeking technicians with a particular skill set in a particular locale. In some embodiments, only individual technicians, e.g., not companies and/or organizations representing groups of technicians, can make their availability known, or offer services, to higher entities. The program instructions described herein include instructions that can execute to allow a technician to access the TMP program access point 202 and to become a "registered technician" in the system 200. By becoming a registered technician, a particular technician will effectively create a record of the attributes for that particular technician, which are then storable, e.g., in one or more files, and accessible through the TMP program access point 202 via an application interface.

FIG. 2 is intended to illustrate that an application interface and program instructions associated with the TMP program access point 202 can execute to provide access to executable instructions associated with a project management (PM) module 204 for purposes of coordinating and controlling access to various stored user files of one or more relevant technicians. A particular project can be assigned to a number of site managers and/or supervisors. In addition, a tier 1 level and/or tier 2 level project manager can also function as a site manager and/or supervisor. By way of illustration, and not by way of limitation, the PM module 204 can include logic, e.g., executable instructions, to select a particular technician for a particular project, e.g., one or more field services, to be performed on behalf of a tier 1 and/or tier 2 entity. For example, the logic can correlate attribute information for a particular technician with tier 1 and/or tier 2 requirements for the particular project (e.g., field service).

FIG. 2 is further intended to illustrate that an application interface and program instructions associated with the TMP program access point 202 can execute to provide access to executable instructions associated with a service call module (SCM) 206. The SCM 206 can include logic to select a particular technician for a particular service to be performed within a specified time frame at a particular location by correlating attribute information for a particular technician with tier 1 and/or tier 2 requirements for the particular service call.

According to various embodiments, program instructions can be executed to search registered technician files in which service provider profiles, which by way of example, and not by way of limitation, can include information about a particular skill set relating to service categories, certification, licensing, bonding, insurance, tools, devices, etc., possessed by the technician, and personal information profiles of the technicians are stored. This can be done, for example, to identify a subset of registered technicians as qualified to perform a set of field services by matching attributes of the technicians with a particular set of desired attributes received from an entity, for instance, a product manufacturer, wanting field servicing relating to their product.

For purposes of the present description, a technician chosen to perform services for a particular project can be a different entity from a technician chosen to perform services for a particular service call. In some embodiments, the first particular user, e.g., technician, chosen to perform services for a particular project and the second particular user, e.g., technician, chosen to perform services for a particular service call are each an individual provider of a particular set of field services.

In some embodiments, instructions can be executed to transmit a communication to registered technicians from a higher tier organization (e.g., first or second tier) that contains the set of desired attributes, the set of field services to be performed, and/or a predetermined compensation for performing such field services. In some embodiments, the program instructions can be executed to receive the information from a tier one entity in a computer hardware installation field of services, wherein, in various embodiments, the second entity includes a number of tier five and lower second entities in a computer hardware installation field of services. For purposes of the present disclosure, the computer hardware installation field of services can comprise activities associated with installation and/or servicing of computer-based hardware, which by way of example, and not by way of limitation, can include activities related to cabling for powering and/or interconnection of the computer hardware, providing physical support for the computer hardware and related equipment, etc.

A number of embodiments provide a resource for higher tier entities (e.g., tier 1 and/or tier 2) to find technicians having particular levels of skill of particular types in order to install their products (e.g., provide field services) in specified projects or to service their products rapidly in specific locations. For example, in some embodiments, program instructions storable in a memory and executable by a processor can be executed to receive information from a first entity regarding a particular set of attributes of a second entity, a set of field services to be performed by the second entity, and/or a predetermined compensation for the field services.

The program instructions can be executed in some embodiments to transmit a communication to a second entity that contains the particular set of attributes, the set of field services to be performed, and/or the predetermined compensation. In some embodiments, instructions executable to transmit the communication to the second entity include transmitting to a pre-registered second entity. By being pre-registered, the second entity can be a technician, for example, having a particular set of attributes stored in the memory connected to the processor. In some embodiments, instructions executable to transmit the communication to the second entity include transmitting to a second entity that has been pre-qualified by the first entity (e.g., being predetermined as qualified to perform a set of field services due to prior performance of such for the first entity). In contrast, in some embodiments, instructions executable to transmit the communication to the second entity include transmitting to an unselected set of second entities.

The predetermined compensation described above can be used to preclude expenditure of time and resources that can occur as a result of a bidding process. For example, in some embodiments, the program instructions can be executed to identify a number of second entities by using particular log-in information submitted when accessing the transmitted communication that enables correlation with a number of the attributes received from the first entity.

For example, by receiving the transmitted communication from the first party containing the particular set of attributes, the set of field services to be performed, and the predetermined compensation, in some embodiments, accessing further information by the second party using particular login information can be considered a tacit agreement with the predetermined compensation. In various embodiments, the instructions executable to transmit the communication regarding the predetermined compensation can include setting the predetermined compensation based on a type of field service provided, which can be determined, for example, by particular attributes of the second entity (e.g., certification in a particular field of service), on a particular field service completed, on a daily rate, and/or on an hourly rate calculation. In some embodiments, the instructions executable to transmit the communication include transmitting to a selected second entity a communication stating that tools to perform the set of field services will be sent to a field services site by the first entity.

In some embodiments, registering interest in the predetermined compensation can be accomplished by either affirmatively responding to a query about such interest, accessing a link present in the electronic communication, or requesting further information about the particular contractual opportunity. The login information provided by various second entities can be used to identify a number of second entities to perform the set of field services by matching a number of the particular set of attributes received from the first entity.

In some embodiments, a first technician, for example, having stored attributes that match at least some of the desired attributes submitted, and indicating an interest in performing the field service for the predetermined compensation, can be awarded a service contract. In some embodiments, the program instructions can be executed to transmit to the first entity information about attributes of the identified number of second entities to enable selection by the first entity. In addition, in some embodiments, the program instructions can be executed to receive a selection from the first entity of at least one of the number of second entities.

In addition, the program instructions can be executed to receive a selection from the first entity of at least one of the number of second entities. The program instructions can be executed, in some embodiments, to identify a number of second entities to perform the set of field services by matching a number of the particular set of attributes received from the first entity.

Figure 3:
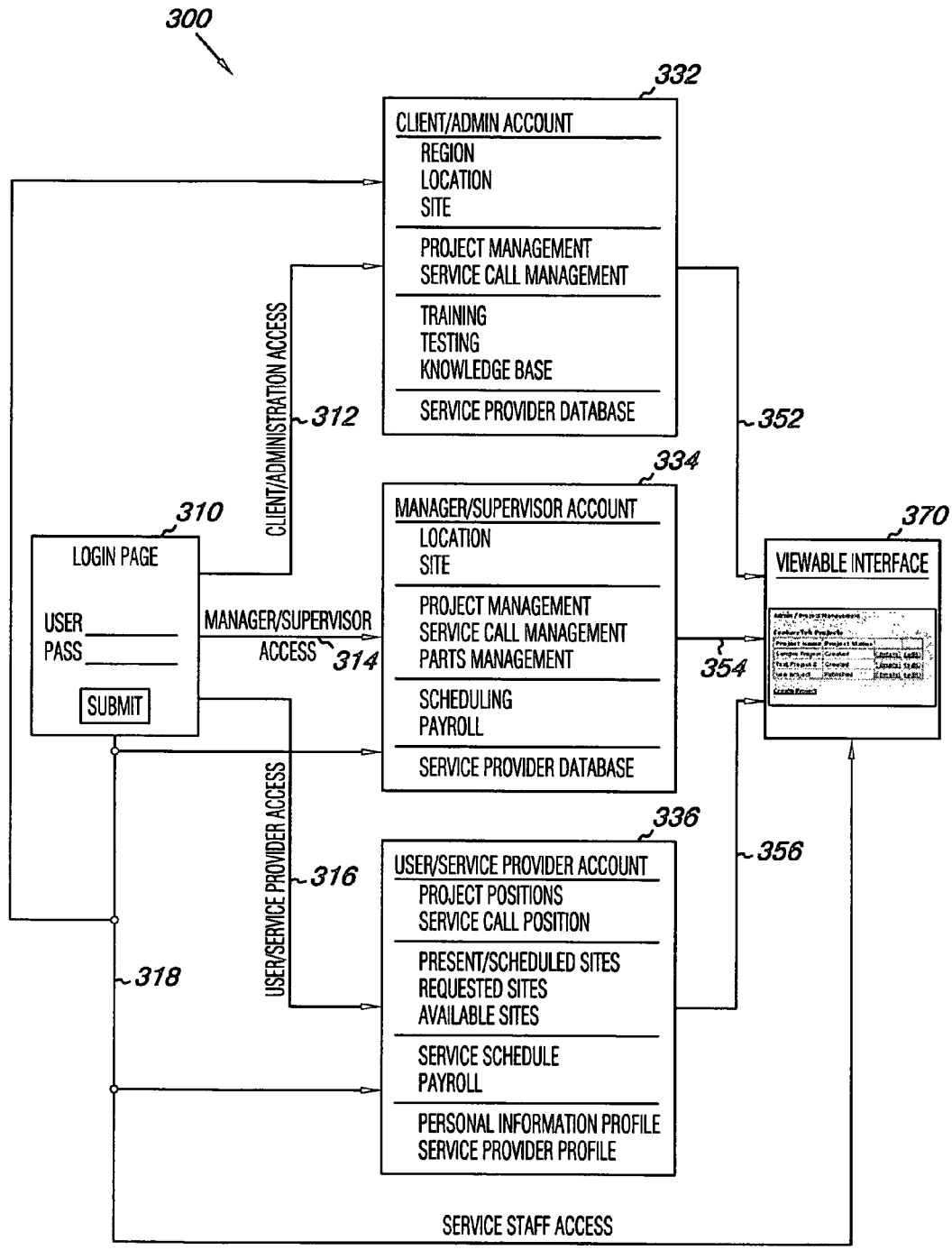
FIG. 3 illustrates an embodiment of an electronic communication system with hierarchal access to particular sources of information according to an embodiment of the present disclosure.

As illustrated in the embodiment of FIG. 2, communication with the TMP program access point 202 can allow access to those having appropriate login account access information, as described with regard to FIG. 3, to a parts management module 208. The parts management module 208 can be used to coordinate ordering, receipt, and return of parts with requirements of the project, the service call, and the technician.

Communicating with a server through the TMP program access point 202 can allow access, for those having appropriate login account access information as described with regard to FIG. 3, to a resource and sales forecast module 210. The resource and sales forecast module 210 can serve as a statistical modeler for comparing cost, value, and risk of contracting for services that utilize the technician having a particular set of field services.

As illustrated in the embodiment of FIG. 2, the TMP program access point 202 can allow access to an accounting/payroll module 212, which can contain a number of sources of information. In some embodiments, the TMP program access point 202 can include an accounting/payroll module 212 whereby services provided by, and time spent doing so, can be documented by the user, a manager of services provided, and/or a recipient of services, among others. In various embodiments, the accounting/payroll module 212 can be accessed by such parties in addition to an administrator (e.g., the manufacturer and/or the project manager), and/or staff of an organization operating the program access point 202 service and maintaining a properly functional TMP program access point 202 and associated modules.

In some embodiments, the accounting/payroll module 212 can document compensation already made to the user, e.g., technician, for services provided and/or pending compensation. In various embodiments, compensation can be provided by the organization operating the program access point 202 service to the user, e.g., technician, who is an independent contractor. Because the user, e.g., technician, is not an employee of the organization operating the program access point 202 service, the organization can be recompensed by upcharging the higher entity (e.g., tier 1 and/or tier 2) for coordinating filling of field service requirements with appropriate technicians and providing compensation for performance of field services. Information relating to user compensation can be accessed by the user, e.g., technician (tier 5 and lower entity), the administrator, e.g., tier 1 and/or tier 2 entity, and/or staff of the organization operating the program access point 202 service, for example.

The accounting/payroll module 212, or a separately accessible module (e.g., a work history module), in various embodiments, can operate on a particular user file and can present information relating to previous, current, and/or prospective utilization of the user. Such information can be provided to the user, e.g., technician, an entity contracting for a service of the user, and/or a manager of the user. In addition, the accounting/payroll module 212 can allow viewing by the technician of accounting information including payroll records, payment of waybills for parts shipment, and/or other financial matters related to performing the contract in some embodiments. The previously described contents of the application/payroll module 212 are presented by way of example and not by way of limitation. Accordingly, an application/payroll module can provide more or less than the functions described, and the described functions can be provided by other system devices in various embodiments.

As illustrated in the embodiment of FIG. 2, a TMP program access point 202 can be used to allow access to a quality assurance module 214. The quality assurance module 214 can, for example, allow information regarding the user, e.g., technician, that is publicly accessible through various outside agencies to be accessed by a prospective contract provider, e.g., the higher entity (tier 1 and/or tier 2), a prospective project manager, a prospective service call manager, and/or a prospective service recipient. Such information can include verification of certification, licensing, documentation of bonding and/or insurance, and/or conviction for committing a particular crime, for example.

A knowledge base module 216, a training module 218, and a testing module 220 are also provided in the embodiment of FIG. 2. In such embodiments, the TMP program access point 202 can assist in coordinating the filling of field service requirements with appropriate technicians by receiving a particular set of desired attributes of a technician from a prospective contracting party. That is, as described below, training and testing of technicians, and in some embodiments providing a knowledge base resource for technicians to consult, can contribute to the total number of technicians considered as qualified to perform technical services for a particular prospective contracting party. Hence, having a larger pool of technicians considered qualified to perform services relevant to products of a prospective contracting party can expedite a search, which can potentially save funds otherwise spent thereon.

The training module 218 can provide training related to the particular set of desired attributes to individual technicians. The testing module 220 can test knowledge related to the particular set of desired attributes possessed by the individual technicians.

The TMP program access point 202 can be used to correlate a number of individual technicians with the prospective contracting party, for example, by providing online training literature and testing a technician's comprehension and grasp of the subject matter via analysis of online responses to questions. For example, the TMP program access point 202 can correlate the prospective contracting party with the technicians having at least a minimum level of knowledge related to the particular set of desired attributes submitted by the prospective contracting party. In some embodiments, the knowledge base module 216 can include an online library including a number of service manuals for products of manufacturers, among other literature. For example, the knowledge base module 216 can be used as a resource to a selected individual technician to assist in performing a technical field service.

In some embodiments, the knowledge base module 216, training module 218, and testing module 220 can be interconnected so as to, for example, provide information from the knowledge base module 216 to be used by the training module 218 in training a technician prior to being tested for comprehension, ability, and understanding of the information by the testing module 220. Accordingly, in some embodiments, an update to the knowledge base module 216 will automatically update the training module 218 and testing module 220. In some embodiments, the interconnection between the training module 218 and the testing module 220 can be two-way, such that a technician can access the testing module 220 to take a test and, in the situation where the technician does not pass the test, the technician can be connected to the training module 218 for further training on the subjects of the incorrectly answered questions before being allowed to access the testing module to repeat taking that particular test.

As illustrated in the embodiment of FIG. 2, the TMP program access point 202 can be used to allow access to a ratings module 224. The ratings module 224 can allow the attributes and performance level of the user, after selection as the technician, to be rated by the user, the administrator, staff of the organization operating the program access point 202 service, a manager of services provided by the user, and a recipient of services provided by the user, among others.

In various embodiments, instructions can be executed to update one or more profiles, stored in a number of user files, based upon ratings of field services performed by the technician in order to allow a prospective contracting party, e.g., the higher entity (tier 1 and/or tier 2), to use ratings of attribute levels based thereon in determining contract providers to whom contracts can be awarded. The server, in some embodiments, can be used to store a particular requirement(s) of a project, e.g., field service. By accessing the server through the TMP program access point 202, the server storing a particular requirement of a project can be used to fulfill particular service requirements. For example, in some embodiments, when the project includes the requirement for either a number of users, which can be technicians, having a number of attribute sets and/or a number of users to be utilized at a number of project locations, program instructions can be executed to identify a number of users able to perform the set of service requirements by matching a number of the particular set of attributes received from the first entity as requirements for the project. The modules described above can be used, in various embodiments, can be used as a system to fulfill the particular field service requirements in project management and/or service call management.

FIG. 3 illustrates an embodiment of an electronic communication system 300 with hierarchal access to particular sources of information according to an embodiment of the present disclosure. In the embodiment of FIG. 3, the system 300 shows access to a viewable interface 370 through logins of various account levels on a viewable login page 310. For example, the viewable interface 370 can be a webpage accessible over the Internet by providing login information at the login page 310. Access to the various account levels is obtained by providing appropriate user login information on the viewable login page 310. In the embodiment illustrated in FIG. 3, four routes of access to corresponding account levels are shown. Appropriate login information allows entry through a client/administrator access 312, a manager/supervisor access 314, user/technician access 316, and/or service staff access 318, for example.

Program instructions can execute to receive particular login information from an entity at the viewable login page 310 and provide control of and/or access to information through account level access that corresponds with the particular login information. Embodiments, however, are not limited to a webpage for login access (e.g., a login function can be an inherent part of accessing an organization's intranet, etc.).

Program instructions can execute to accept logins of various account levels at the viewable login page 310. In the embodiment shown in FIG. 3, program instructions can execute to provide access to the viewable interface 370 based upon input appropriate to various account levels. According to various embodiments, each account level has various degrees of access, administration, and control. In the example embodiment of FIG. 3, four account levels are shown that are accessible to the client/administration 312, the manager/supervisor 314, the user/technician 316, and the service staff access 318. However, in various embodiments, more or fewer account levels can be provided.

In the exemplary embodiment of FIG. 3, program instructions associated with the viewable interface 370 can execute in response to client or administrator, which can be the same entity, login information to provide account access 312 to a client/administrator account level 332, as well as access 352 to the viewable interface 370. In such embodiments, program instructions associated with the viewable interface 370 can also execute in response to manager or supervisor, which can be the same entity, login information to provide manager/supervisor account access 314 to one or more manager/supervisor account levels 334 as well as access 354 to the viewable interface 370. Program instructions associated with the viewable interface 370 can further execute in response to user or technician, which can be the same entity, login information to provide user/technician account access 316 to a user/technician account level 336, as well as user/technician access 356 to the viewable interface 370.

Program instructions associated with the viewable interface 370 can further execute in response to service staff login information to enable service staff access 318 to one or more of the account levels 332, 334, and 336. For example, a particular account level can be accessed by server staff of the organization operating the program access point 202 service for introduction of updated information, deletion of outdated information, correction of erroneous information, and for other purposes related to improvements in function of the TMP program access point 202 of the embodiment of FIG. 2.

In various embodiments, the service staff access 318 may be designed to not provide for alteration of account content or function with regard to information accessible by the viewable interface 370 without permission from parties associated with a particular account. However, in such embodiments, program instructions for the service staff level access 318 can execute to provide access to service staff members of the viewable interface 370 for viewing displays of all account information in the viewable interface 370 for rectifying problems affecting other accounts.

Each of the account levels 332, 334, and 336 shown in FIG. 3 can perform certain account administration tasks to control and administer content on the viewable interface 370 by executing various program instructions, as described herein. Program instructions can execute to perform account administration tasks such as viewing, editing, adding, or deleting accounts, in addition to viewing, editing, adding, or deleting information in accounts, at the particular account level, among other functions.

In the embodiment of FIG. 3, program instructions associated with the client/administrator account level 332 can execute to provide the ability to view, edit, add, or delete accounts and information in the manager/supervisor account level 334 and user/technician account level 336. According to various embodiments, program instructions associated with the manager/supervisor account level 334 can execute to perform account administration tasks of viewing, editing, adding, or deleting accounts and information at the user/technician account level 336. In the embodiment of FIG. 3, program instructions can execute so that the client/administrator level 332 can administer the manager/supervisor account level 334 and the user/technician level 336, the manager/supervisor level 334 can administer the user/technician account level 336, and the user/technician account level 336 cannot administer account levels other than particular functions related to an individual's personal account. As such, administration of accounts can be performed in a hierarchal fashion.

In various embodiments, program instructions can also execute so that each of the account levels 332, 334, and 336 shown in FIG. 3, can control what information is shown in the viewable interface 370 based on various selections within one or more account levels. In such embodiments, program instructions can execute to show in the viewable interface 370 controlled information from the TMP program access point 202, as shown in FIG. 2, in response to these selections, as described in connection with FIG. 2.

In the embodiment of FIG. 3, program instructions can execute to accept various selection options in each account level for control of the information accessible in the viewable interface 370. For example, for the client/administrator account level 332, program instructions can execute to provide various selection options. In some embodiments, the selection options can include options to select a particular region, location, and/or site for viewing, editing, adding, and/or deleting accounts, in addition to viewing, editing, adding, and/or deleting information in accounts, relating to project management and/or service call management. Moreover, for the client/administrator account level 332, program instructions can execute to select a training module, a testing module, and/or a knowledge base module associated with related project management and/or service call management for viewing, editing, adding, and/or deleting information, such as the modules described in connection with the embodiment of FIG. 2. In addition, the client/administrator account level 332 program instructions can execute to select a technician database for viewing and, in some embodiments, editing, adding, and/or deleting information.

For the manager/supervisor account level 334, program instructions also can execute to provide various selection options, including an option to select a particular location or site for viewing, editing, adding, or deleting accounts, in addition to viewing, editing, adding, or deleting information in accounts, relating to project management, service call management, and/or parts management. Moreover, program instructions for the manager/supervisor account levels 334 can execute to select appropriate modules for viewing, editing, adding, or deleting information related to scheduling of particular technicians and compensation for services provided. In addition, program instructions for the manager/supervisor account level 334 can execute to select a technician database for viewing and, in some embodiments, for editing, adding, or deleting of information.

For the user/technician account level 336, program instructions can execute to provide various selection options, including an option to select available opportunities for project positions and service call positions. Other selection options for the user/technician account level 336 include documentation of project and service call sites presently scheduled for service by the user, e.g., technician, along with those sites scheduled for future service by the user, the status of sites requested by the user in response to accessing available opportunities for project positions and service call positions, and particular sites having openings for project positions and service call positions. Moreover, program instructions for the user/technician account 336 can execute to select appropriate modules for viewing scheduling of service to be provided by the particular user and viewing the status of compensation for services already provided, e.g., service payroll schedule, and, in some embodiments, for editing, adding, or deleting information. In addition, program instructions for the user/technician account level 336 can execute to select a personal information profile database, which can document information for the user, such as name, address, telephone number, electronic messaging address, etc., and a service provider profile database, which can document information about the technician, which by way of example, and not by way of limitation, can include information about skill sets in particular service categories, certification, licensing, bonding, insurance, tools, devices, etc., possessed by the technician, for viewing and, in some embodiments, for editing, adding, or deleting of information.

Figure 4:
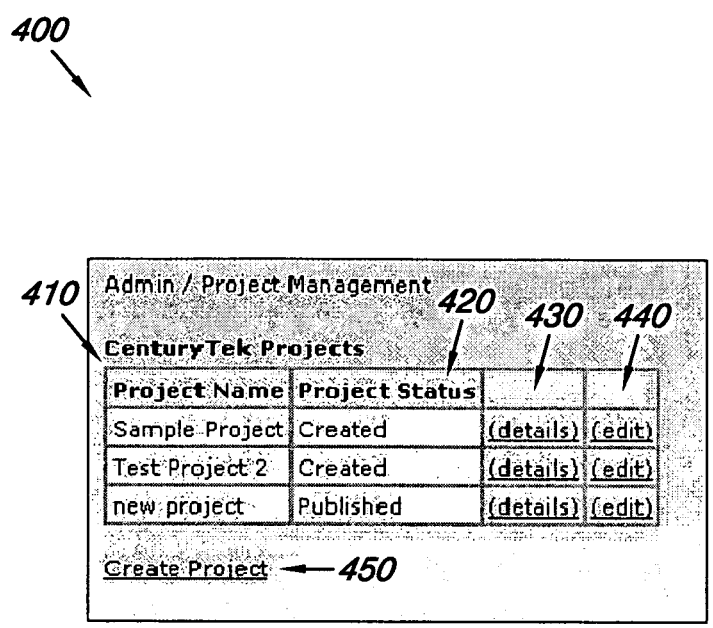
FIG. 4 illustrates an embodiment of a viewable interface that includes sources of information accessible to administrators and project managers according to the present disclosure.

FIG. 4 illustrates an embodiment of a viewable interface 400 that includes sources of information accessible to administrators and project managers according to the present disclosure. Program instructions for the viewable interface 400 can execute to show and provide access to information related to management of field service projects to parties having appropriate login information. For example, in various embodiments, the viewable interface 400 can be accessed through the client/administration access 312 and the manager/supervisor access 314 of the embodiment of FIG. 3. This embodiment of the viewable interface 400 shows a column that lists project names 410, a column providing a project status 420 associated with a corresponding project, a column allowing access to details 430 of a corresponding project, and a column allowing access to an edit function 440 related to a corresponding project. In addition, this embodiment of the viewable interface 400 shows a link 450 allowing access to a function enabling creation of a project, which in some embodiments is a new project to be added to the list in the project name column 410.

FIG. 5 illustrates another embodiment of a viewable interface 500 that includes sources of information accessible to administrators and project managers according to the present disclosure. Program instructions for the viewable interface 500 can execute to show and allow editing of information related to management of field service projects to parties having login information appropriate to access the viewable interface of the embodiment of FIG. 4. The program instructions for the viewable interface 500 can execute to show and allow editing of the name of a project manager 510, a project name 520, a project description 530, and a project's start and end dates 540.

In the viewable interface 500, program instructions can execute so that a technician section 550 shows and allows editing of information related to technicians contracted to provide services on the particular project. Included in the information displayed in this embodiment of the technician section 550 are start and end times 551 for technicians providing services at a particular work site, a technician pay rate 552, a pay basis 553 for the pay rate 552, e.g., per site, per project, hourly rate, etc., which in the example of FIG. 5 is a pay per site basis. In addition, the technician section 550 shows an indication of a number of devices 554, for example, a digital camera, to be brought to the work site by the technician, an indication of an average time required to complete 556 a field service, an upload section 557 for allowing the technician to upload information related to the services provided, for example, a picture of the completed work from the digital camera. The information displayed in the embodiment of the technician section 550 in FIG. 5 shows the default values for each and every technician providing services on the project, however, in some embodiments, these values can be changed for each work site of the project and for each technician providing services at the various work sites of the project. For example, a project may involve installing computer hardware for a particular business at a number of different sites.

In the viewable interface 500, program instructions can execute so that an electronic messaging alert section 560 shows and allows editing of information related to sending electronic messaging alerts to technicians when the project and its sites are published, that is, when such information is made available to technicians, for example, through the TMP program access point 202 of the embodiment of FIG. 2. Program instructions can execute to receive an electronic messaging alert selection and, when selected, can send an electronic messaging alert to all technicians in the area of a particular work site, which can be the default for each site of the particular project. Program instructions also can execute to receive a radius selection 567 that can determine how many miles from each site electronic messages to technicians should be sent. In some embodiments, an upper limit of miles can be set for the radius selection 567, which is 200 miles in the embodiment illustrated in the electronic messaging alert section 560. In various embodiments, the radius selection 567 can be measured as a radius from a particular site location, or in other embodiments the radius selection 567 can be measured as a radial distance from a boundary of a ZIP code area containing the site. Program instructions can execute to update the project details in response to selection of an Update Project button 569.

Figure 6:
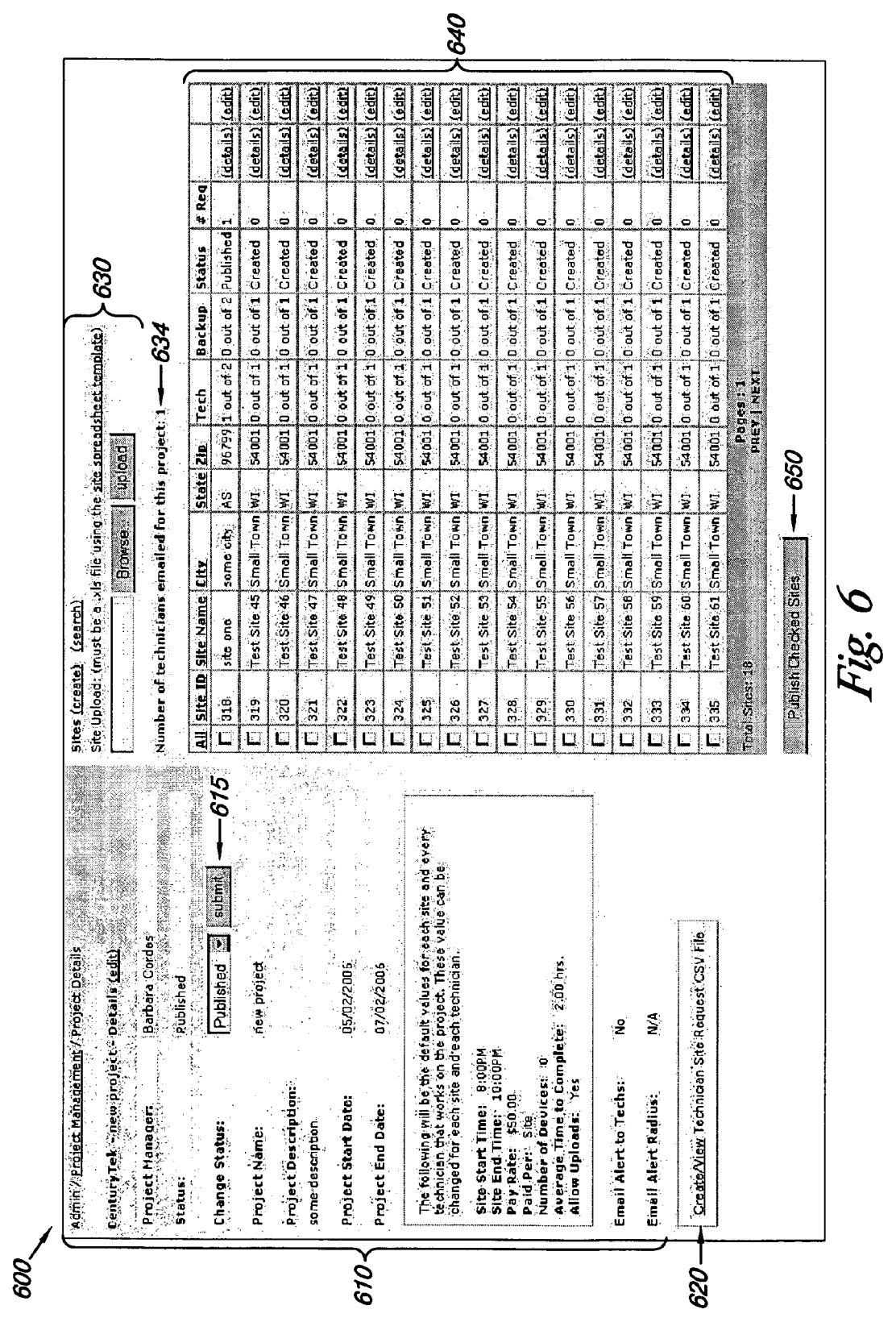

FIG. 6 illustrates another embodiment of a viewable interface 600 that includes sources of information accessible to administrators and project managers according to the present disclosure. Program instructions for the viewable interface 600 can execute to show and allow editing of information related to management of field servicing projects to parties having login information appropriate to access the viewable interface 400 of the embodiment of FIG. 4. Program instructions for the embodiment of the viewable interface 600 can execute to show details of projects. For example, in a project summary section 610, many of the project details shown in the viewable interface of the embodiment of FIG. 5 are displayed in summary form. In addition, in the project summary section 610, a project status selection 615 allows the status of the project to be changed. A technician site request link 620 allows for creating and/or viewing a technician site request file in which requests from technicians to work on a particular project and/or site can be documented.

Program instructions for a site upload section 630 allow creation of one or more work sites by uploading information supplied using a site spreadsheet template and/or by searching for information related to one or more particular sites. This searching can be performed by either directly entering a site-specific ID number, or by browsing for a link to a particular site. The viewable interface 600 includes a technician indicator 634 that indicates how many technicians have been electronically messaged information related to the particular project being displayed.

Program instructions for a site summary section 640 can execute to display a listing of sites associated with a particular project. Various information regarding sites can be shown in the site summary section 640. For example, in the embodiment of FIG. 6, the site summary section 640 includes a site ID, a site name, the city, state, and ZIP code in which the site is located, a number of technicians recruited out of a number of positions available, a number of backup technicians recruited out of a number of such positions available, a status of the work site, and a number of requests from technicians to perform services at the work site. In addition, the site summary section 640 provides links allowing details of particular sites to be viewed and/or edited.

In the first column of section the site summary 640, boxes are shown that can be either individually selected or selected as a group for publishing information about the selected site(s). Program instructions can execute to publish the information in response to a selection of a Publish Selected Sites button 650. When published, the information can be accessed and viewed, and in some embodiments, responded to, by parties having appropriate access information, through the TMP program access point 202 of the embodiment of FIG. 2. For example, a technician can learn information about a published work site that prompts a request to be considered for providing service at the published work site.

Figure 7A:
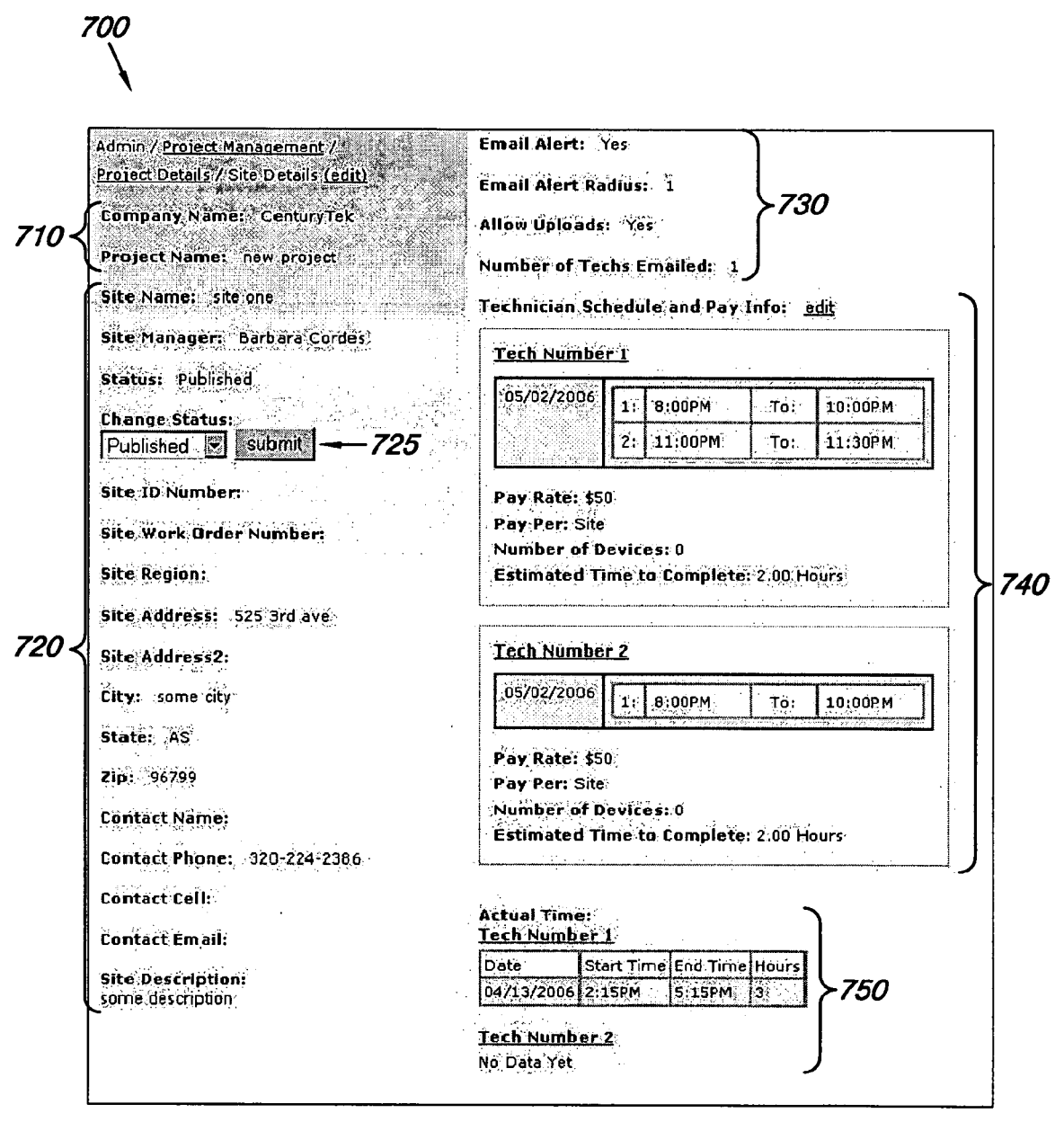

FIGS. 7A-7B illustrate embodiments of viewable interfaces 700 and 701 that include sources of information accessible to administrators and project managers relating to selection of technicians according to the present disclosure. Program instructions for the viewable interface 700 illustrated in the embodiment of FIG. 7A can execute to show details of information regarding recruitment of technicians for a particular site. A project information section 710 of the viewable interface 700 shows a company name and a project name for the particular site. Program instructions for a site details section 720 can execute to provide specific information regarding the work site. The site details section 720 includes site status selection 725 that allows the status of the site to be changed. The viewable interface 700 also includes an electronic messaging alert section 730, a technician summary section 740, and an actual time section 750.

Program instructions for the viewable interface 701 illustrated in the embodiment of FIG. 7B can execute to show details of information relating to recruitment of technicians for a particular site. In the embodiment illustrated in viewable interface 701, among other links to information, a site technician section 760 shows the status of particular filled and available technician positions at a particular work site, e.g., site technicians. A site status section 770 shows how many technicians have been selected, confirmed, approved, rated, and paid for a particular site.

A site comments section 780 shows comments directed to the site, for example, from a project manager to a site manager, along with a link to enable the addition of such comments. Program instructions can execute to upload a file in response to a selection of an upload files link 790. Program instructions can execute to control the number and type of comments available to a particular user.

Figure 8:
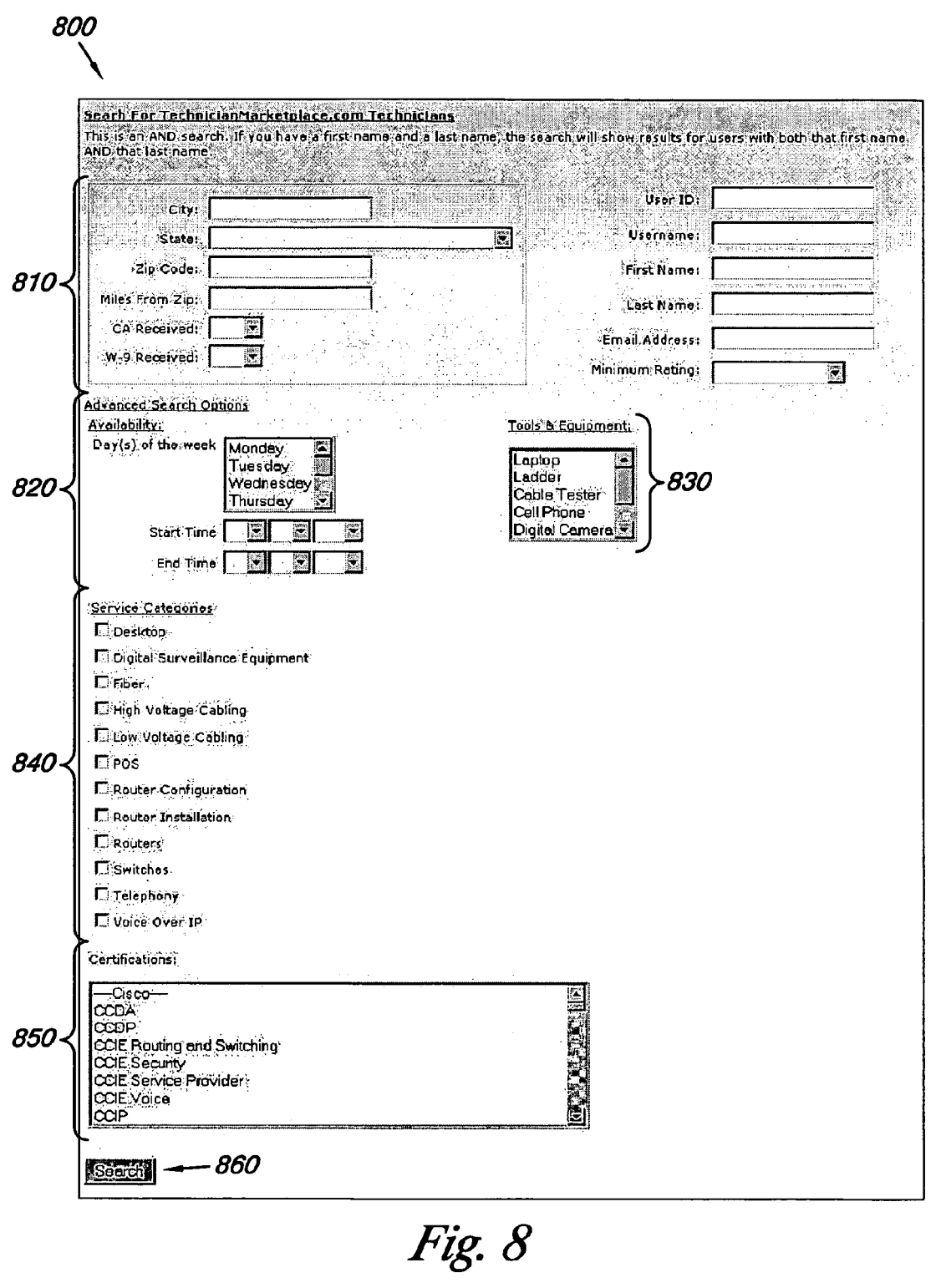

FIG. 8 illustrates an embodiment of a viewable interface 800 that includes sources of information accessible to administrators and/or project managers according to the present disclosure. Program instructions for the viewable interface 800 illustrated in the embodiment of FIG. 8 can execute to show details of attributes of a desired technician available for providing services for a particular project and/or a particular site. Program instructions for basic search input fields 810 can execute to receive basic information about a work location, attributes, and identities of technicians being searched. In some embodiments, section 810 can specify a particular number of miles from the ZIP code of the work location that the desired technician's residence should be within. In various embodiments, section 810 can indicate whether the desired technician has had a contract agreement (CA) already received by an administrator and/or project manager in connection with services performed and/or to be performed. Section 810 can indicate in various embodiments whether the desired technician has had a W-9 form already received by an administrator and/or project manager in connection with services performed and/or to be performed. In addition, as illustrated on the right side of section 810, various embodiments can indicate whether the desired technician has a minimum rating and, if so, the value of the minimum rating. Also illustrated on the right side of section 810 in the embodiment illustrated in FIG. 8, are windows for the user of the viewable interface to supply information allowing identification of, and communication with, a specified desired technician.

Program instructions for availability search section 820 can execute to receive and/or search selections for the days of the week and the start and end times during which the technician's service is desired. Program instructions for a tools search selection 830 of viewable interface 800 can execute to allow the administrator and/or project manager to indicate tools and equipment, which includes communication devices, that the desired technician can be expected to provide. Program instructions for a service search selection 840 can execute to allow the administrator and/or project manager to indicate service categories in which the desired technician can be expected to have experience. Program instructions for certification search selection 850 can execute to receive search selections from the administrator and/or project manager indicating various fields of service in which the desired technician can be expected to have achieved certification.

After providing the information described above, the administrator and/or project manager can select a search button 860 to allow a search, for example, through the TMP program access point 202 of the embodiment of FIG. 2, for available technicians with attributes matching a minimum number of the specified attributes. In response to a selection of the search button 860, program instructions can execute to use search information and search selections from the input fields and selections 810-850 to search a database of technicians for particular technicians with attributes that correlate to the search information and search selections received.

Figure 9:
FIG. 9 illustrates an embodiment of a viewable interface that includes sources of information accessible to administrators, project managers, and service call managers according to the present disclosure.

FIG. 9 illustrates an embodiment of a viewable interface 900 that includes sources of information accessible to administrators, project managers, and service call managers according to the present disclosure. Program instructions for the viewable interface 900 illustrated in the embodiment of FIG. 9 can execute to show details of information regarding attributes of a particular technician available for providing services for a particular project and/or a particular service call. An image section 910 shows a photograph of the particular technician that can be optionally uploaded by the technician. The viewable interface 900 also includes employment information 920, personal information 930, certification information 940, and service category information 950 for the particular technician. In some embodiments, the viewable interface 900 can execute to show current characteristics of the particular technician, which by way of example, and not by way of limitation, can include active/inactive status, denied status, e.g., meaning the technician has been excluded from performing particular types of service, and/or availability for service determined by hours of the day, dates, and/or days of the week, etc. In addition, information can be included regarding particular tools and or devices, e.g., a digital camera, that the technician can contribute to performing a service. The information about the particular technician can be stored in a database, and searched by using the viewable interface 800 of the embodiment of FIG. 8.

Figure 10:
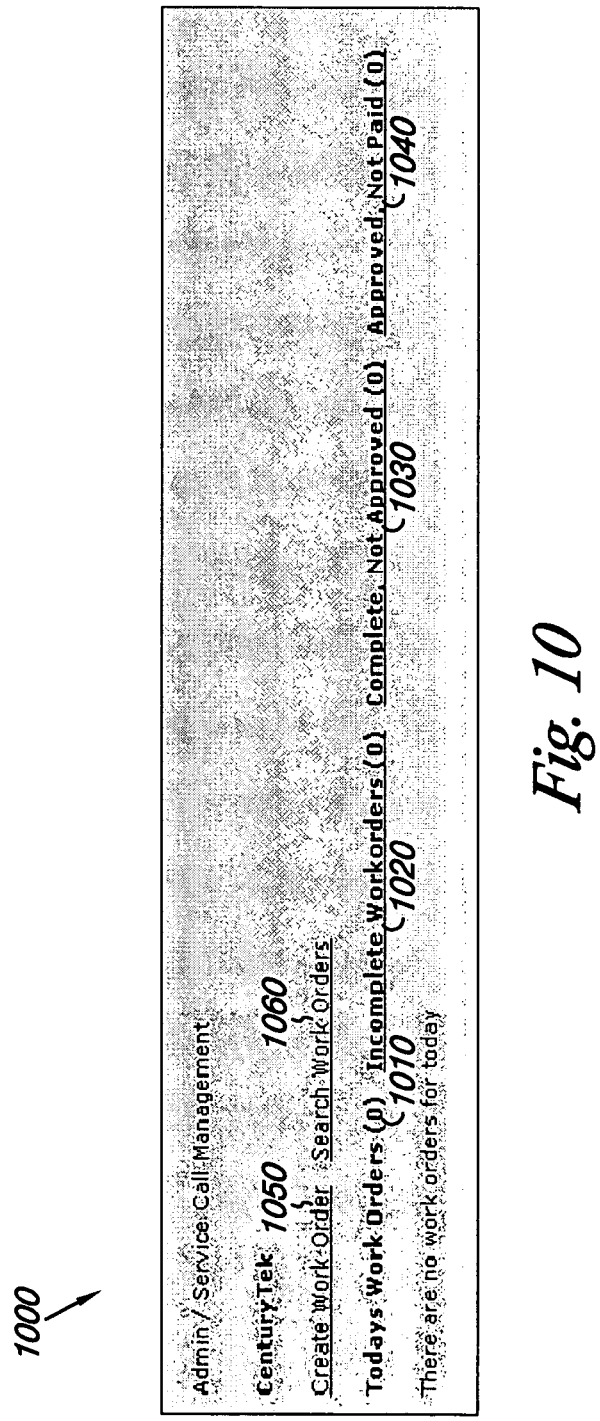
FIG. 10 illustrates an embodiment of a viewable interface that includes sources of information accessible to administrators and service call managers according to the present disclosure.

FIG. 10 illustrates an embodiment of a viewable interface 1000 that includes sources of information accessible to administrators and service call managers according to the present disclosure. As used herein, an administrator and service call manager control selection of particular technicians for particular service call work orders, and associated matters, and can be the same entity. Program instructions for the viewable interface 1000 can execute to show status of service call work orders and allow access to parties having login information appropriate to access viewable interface 1000. For example, in various embodiments, the viewable interface 1000 can be accessed through the client/administrator access 312 and the manager/supervisor access 314 of the embodiment of FIG. 3. The viewable interface 1000, in some embodiments, includes information about a number of a particular day's (e.g., today's, as shown in FIG. 10) work orders 1010, a number of the particular day's incomplete work orders 1020, a number of the particular day's complete, but not approved, work orders 1030, and a number of the particular day's approved, but not paid, work orders 1040. In the embodiment of FIG. 10, there are zero today's work orders 1010, zero incomplete work orders 1020, zero complete, but not approved, work orders 1030, and zero approved, but not paid, work orders 1040.

Some embodiments of viewable interface 1000, as shown in FIG. 10, provide a create work order link 1050 allowing creation of a work order, for example, when a customer of the field servicing program described herein, e.g., through the TMP program access point 202 of the embodiment of FIG. 2, requests a technician to correct a malfunctioning piece of equipment. Program instructions can execute to create a work order in response to a selection of the create work order link 1050. Some embodiments of viewable interface 1000 provide a search work order link 1060 allowing access to a search function for finding a particular work order. Program instructions also can execute to search work orders in response to a selection of a search work order link 1060. Although the embodiment illustrated in FIG. 10 shows work orders from a single day, for example, the current day 1010, some embodiments of viewable interface 1000 can show a total number of existing work orders.

Figure 11:
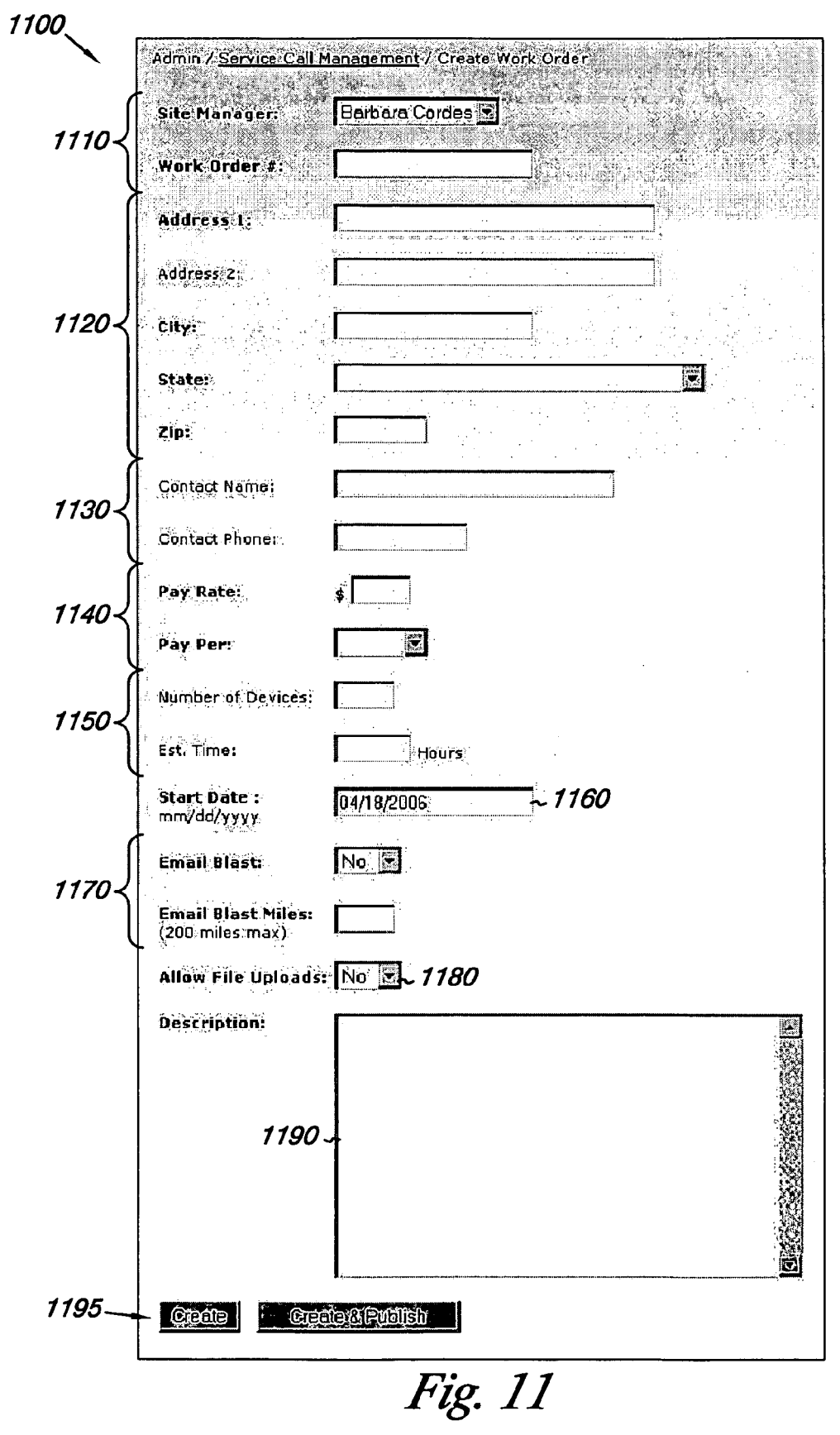

FIG. 11 illustrates another embodiment of a viewable interface 1100 that includes sources of information accessible to administrators and service call managers according to the present disclosure. Program instructions for the viewable interface 1100 illustrated in the embodiment of FIG. 11 can execute to receive information and selections for creating a work order for a service call, e.g., through link 1050 of the embodiment of FIG. 10. In some embodiments, the information and/or selections can be provided by a customer to a service call manager when requesting a technician to correct a malfunctioning piece of equipment. In the viewable interface 1100, a site summary section 1110 shows a selectable name of the site manager and a work order number input field for assigning a work order number to a particular work order. A site location section 1120 includes input fields for entry of information regarding the location of the site at which service is requested. A contact information section 1130 includes input fields for entry of contact information for the site, which in some embodiments can include a customer's name and telephone number.

In some embodiments of viewable interface 1100, a pay information section 1140 can be included with input fields and/or selections for entry of a pay rate and/or a pay basis. In some embodiments, a work information section 1150 can include input fields for indicating the number of devices to be serviced and an estimated time for such servicing. Some embodiments of the viewable interface 1100 can include a start date input field 1160 for the work order, whereas other embodiments can provide a specified time window during which the servicing of the work order is to be performed.

As part of the work order being created in viewable interface 1100 of FIG. 11, initiation of a search for a technician to provide the service can be preformed. Accordingly, an electronic messaging alert section 1170 can include selections and input fields for sending an electronic messaging message to technicians within a particular radius of the intended service location in order to invite a response, for example, through TMP program access point 202 of the embodiment of FIG. 2. The viewable interface 1100 also can include an upload selection 1180 for allowing technicians to upload files. Further information regarding the service call can be entered in a description input field 1190. Program instructions can execute to use the information and selections from input fields and selections 1110-1190 to create a work order for a service call for field services to be performed by a technician. The creation and/or publication of a work order can be performed in response to a selection of a button from the buttons 1195 in the viewable interface 1100. Program instructions can execute to send an electronic messaging blast to technicians in response to selections and information received in the electronic messaging alert section 1170. Program instructions can also execute to publish a created work order so that technicians can view the work order, for example, through the TMP program access point 202 of the embodiment of FIG. 2.

FIG. 12 illustrates an embodiment of a viewable interface 1200 that includes sources of information about projects and service calls that is accessible to technicians according to the present disclosure. Program instructions can execute to show information relating to work sites of interest to a particular technician. In a my sites section 1210, service calls and/or project sites at which the particular technician is scheduled to perform services are listed. The my sites section 1210 can include information describing a project name of a position filled, a location at which the service is to be performed, a start date, and a status of the opening. Program instructions for a confirm column 1212 can execute to allow the particular technician to confirm acceptance of the opportunity to provide services. Program instructions for the confirm column 1212 can also execute to display that such confirmation has been made by the particular technician. In some embodiments, program instructions for a details column 1214 can execute to allow the particular technician to access details regarding services to be performed. In some embodiments, program instructions for a release column 1216 can execute to allow the particular technician to release a service call and/or project, so that it can be performed by another technician.

In some embodiments, the viewable interface 1200 includes a requested sites section 1220 that can show the status of sites at which the technician has requested an opportunity to provide service, for example, through the TMP program access point 202 of the embodiment of FIG. 2. Some embodiments of the viewable interface 1200 can include an available sites section 1230 that shows the sites available at which the technician can request an opportunity to provide service. In some embodiments, program instructions for a conflict in scheduling module can execute to prevent, by way of example, and not by way of limitation, simultaneous scheduling of servicing by a technician, scheduling of unreasonable numbers of service opportunities in a particular time frame, scheduling in excess of eight (8) hours per day of service work, etc.

FIG. 13 illustrates an embodiment of a viewable interface 1300 that includes sources of information about a service call that is accessible to technicians according to the present disclosure. Program instructions for the viewable interface 1300 illustrated in the embodiment of FIG. 13 can execute to show information relating to site and work details with regard to a service call with regard to which a technician has been selected to provide services. Program instructions for a site details section 1310 can execute to show information about a site for a work order of a service call. A message 1320 in the embodiment of 1300 can indicate that the technician has been chosen to perform work at the site. Program instructions for a comments section 1330 can execute to show comments sent to the chosen technician regarding services for the site. Program instructions for a files section 1340 can execute to allow the chosen technician to access, or upload, particular files relevant to the services for the site.

With regard to the embodiment illustrated in viewable interface 1300 of FIG. 13, a time section 1350 can display an actual number of hours the chosen technician spent performing services for the site. In some embodiments, an approval indicator 1360 can show whether the work provided by the chosen technician has been approved for compensation and a payment indicator 1370 can show whether a payment has been made for the services performed by the chosen technician.

FIG. 14 illustrates an embodiment of a viewable interface 1400 that includes sources of information about a number of service call positions that is accessible to technicians according to the present disclosure. Program instructions for the viewable interface 1400 illustrated in the embodiment of FIG. 14 can execute to show information relating to service call position openings 1410, a company description 1420, e.g., a higher level entity (tier 1 and/or tier 2) seeking a technician for performance of particular field services, job information 1430, and an application link 1440 for the service call positions. In various embodiments, the job information 1430 can include a job overview 1432 of the service call position and the services to be provided a area listing 1434 can be included of locales in which service call positions are available, a payment/frequency of work section 1436 can be included describing typical services to be provided and the compensation offered therefor, and a training/timing section 1438 can be included describing training issues and dates for the service call positions. If a technician is interested in being considered for the service call positions, the technician can select an application link 1440. Program instructions can execute in response to such a selection to allow the selecting technician access in order to complete application materials for the service call positions.

FIG. 15 illustrates an embodiment of a viewable interface 1500 that includes sources of information about a particular work site that is accessible to technicians according to the present disclosure. Program instructions for the viewable interface 1500 illustrated in the embodiment of FIG. 15 can execute to show information relating to site details of a particular work order for a service call, for example, as described with regard to FIG. 14. The embodiment of viewable interface 1500 includes general information 1510 regarding the company and project associated with the work order. A site information section 1520 can show information relevant to the particular work site. A technician information section 1530 can include information relating to schedule of and compensation for services to be performed at the site. If a technician is interested in being considered for performing the work at the site, the technician can select a request link 1540. In some embodiments, a technician can specify a preference for being considered for a principal technician position and/or an assistant technician position. Program instructions can execute to respond to such a selection by submitting the request for the particular site.

FIG. 16 illustrates an embodiment of a viewable interface that includes sources of information about rating of technician characteristics that is accessible to project managers, service call managers, technicians, and service recipients according to the present disclosure. Program instructions for the viewable interface 1600 illustrated in the embodiment of FIG. 16 can execute to show a technician rating form with which the characteristics of a particular technician can be rated. A work order input field 1610 can be used to associate a work order number with service provided by the technician being rated. In some embodiments, rating selections 1620 can be used to select ratings for a number of characteristics of the particular technician.

Program instructions can execute to receive a selection, such as poor, below average, average, above average, and superior for each of the ratings selections. A comments input field 1630 can be used to enter written comments related to one or more ratings of the particular technician. Program instructions can execute in response to a selection of the rate button 1640 to store the ratings selections 1620 and/or comments in the comments input field to a database for further use through, for example, the TMP program access point 202 of the embodiment of FIG. 2.

The functionalities described above, as accessed through the TMP program access point 202 of the embodiment of FIG. 2 and/or in connection with the accessible and/or viewable interfaces described in connection with FIGS. 3-16, can be performed by a processor executing computer-readable instructions storable on a computer-readable medium of a computing device. As indicated herein in various embodiments, the computer-usable medium can include computer-readable instructions for storing attributes of a number of individual technicians and for communicating a particular contractual opportunity having a predetermined compensation arrangement to the number of individual technicians. In some embodiments, the medium for communicating can include computer-readable instructions for sending information using various communication technologies, such as digital and/or analog technologies, landline and/or mobile technologies, telephone technologies, radio technology, electronic messaging technology, fiber optic technology, and intranet and/or internet communications via modem, cable, wireless, and/or satellite technologies.

This medium can include computer-readable instructions for registering interest in the particular field service contractual opportunity by at least one individual technician. In various embodiments, computer-readable instructions can execute to register such interest with either an affirmative response to a query about such interest, an access of a link present in the electronic communication, and/or a request for further information about the particular field service contractual opportunity.

Computer-readable instructions can be executed, in some embodiments, to award a contract to a first (e.g., the first in time to register interest) qualified individual technician based on interest in the particular contractual opportunity and on stored attributes matching a number of attributes submitted by a client, which can be a higher tiered entity (e.g., a tier 1 manufacturer and/or a tier 2 project manager).

For example, in some embodiments, when rapidly filling an opening for a technician is desired by the client, computer-readable instructions can execute to designate and/or authorize the first individual technician in time to register interest, based at least in part on agreement to perform at the predetermined compensation, to perform the services (e.g., the first individual technician will be awarded a contract). However, awarding a contract to, designating, and/or authorizing performance by the first in time to register interest can be dependent upon whether a minimum number and/or distribution of the individual technician's stored attributes match a number and/or distribution of attributes submitted by the client, which can be, in some embodiments, what determines whether the individual technician is "qualified". In various embodiments, a medium can include computer-readable instructions for storing attributes of a number of individual technicians, such as storing attributes of a number of individual field technicians, storing attributes of a number of pre-registered individual field technicians, and/or storing attributes of a number of qualified individual field technicians.

In some embodiments, computer-readable instructions can execute so that an actual designation and/or authorization of a qualified technician to perform a service (e.g., awarding a contract), can depend upon confirmation by the technician of an intent to perform such a service. For example, the instructions can execute to require receiving a confirmation that the qualified individual technician intends to perform a service for the predetermined compensation at a particular time, day of week, and date as a prerequisite for determination that a contract has been awarded.

In some instances, the medium can be used for determining that the confirmation from the qualified individual technician is absent a particular number of hours before the service is to be performed and selecting another technician from a preselected backup group of qualified individuals. By way of example, and not by way of limitation, if the individual technician to whom the contract has been provisionally awarded does not confirm an intent to perform the service within 24 hours of a particular time, day of week, and date, the medium can be used for determining that the confirmation from the qualified individual technician is absent a particular number of hours (e.g., 4 hours) before the service is to be performed and the medium can be used for selecting another technician from a preselected backup group of qualified technicians.

In some embodiments, the medium can be used for communicating to the qualified backup technician and confirming availability of the backup to perform the service. By way of example, and not by way of limitation, if the individual technician to whom the contract has been provisionally awarded does not confirm an intent to perform the service within 24 hours of a particular time, day of week, and date, the medium can execute program instructions for transmitting a communication to the qualified backup technician four (4) hours prior to the intended time for performance of the service.

In some embodiments, the medium of can be used for stopping communicating the particular contractual opportunity to individual technicians and registering interest therein when confirmation is received from the qualified individual technician. For example, executing instructions to communicate a particular contractual opportunity to individual technicians can be stopped when a qualified technician confirms an intent to perform the service at the intended time. The confirming technician can be the original qualified technician provisionally awarded the contract and/or the qualified backup technician contacted as a result of not receiving confirmation from the original provider within a particular time period prior to the intended performance of the service.

In some embodiments, the medium can be used for communicating a particular contractual opportunity and registering interest therein whereby such communication is accomplished by providing a graphic user interface on a platform allowing a real time status management display for use by the individual technician. For example, computer-readable instructions for the TMP program access point 202 of the embodiment of FIG. 2 can be executed for confirming an intent to perform a provisionally awarded contract, thereby causing a display of acknowledgment of such confirmation and a stoppage of communicating the particular contractual opportunity to other individual technicians. In some instances, computer-readable instructions can execute so that a provisionally awarded contract awaiting confirmation can display in real time the time remaining prior to selecting another technician from a preselected backup group of qualified individuals.

Figure 17:
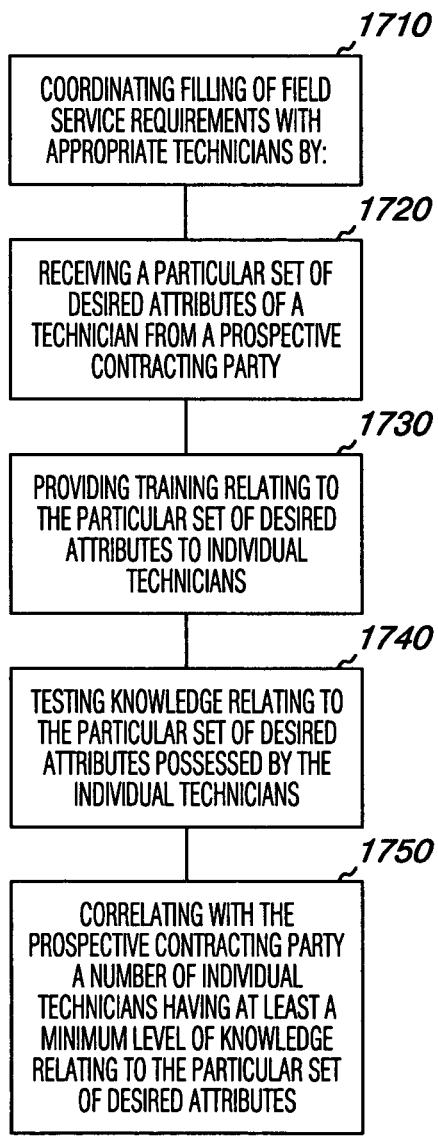
FIG. 17 is a block diagram illustrating a method for supplying technicians according to the present disclosure.

FIG. 17 is a block diagram illustrating a method for supplying technicians according to the present disclosure. The method in the embodiment of FIG. 17 includes coordinating filling of field service requirements with appropriate technicians, as shown in block 1710. At block 1720, the method includes receiving a particular set of desired attributes of a technician from a prospective contracting party, as shown in block 1720. As shown in block 1730, the method includes providing training relating to the particular set of desired attributes to individual technicians. Such training can be provided, for example, as received at block 1720 using a combined audio and visual teaching aid, an audio teaching aid, and/or a video teaching aid. The method also includes at block 1740 testing knowledge relating to the particular set of desired attributes from block 1720 and possessed by the individual technician. At block 1750, the method includes correlating with the prospective contracting party of block 1720 a number of individual technicians having at least a minimum level of knowledge relating to the particular set of desired attributes of block 1720.

In some embodiments of the method illustrated in FIG. 17, the method can include selecting by the prospective contracting party from individual technicians when a number of individual technicians have at least the minimum level of knowledge relating to the particular set of desired attributes. Some embodiments of the method can include providing a knowledge base resource to a selected individual technician to assist in performing a technical field service. Some embodiments of the method can include receiving a particular set of desired attributes that includes specifying either proximity of the technician to an intended field service site, a certification to perform an intended field service, or a weighted combination of the proximity and the certification.

Embodiments of the present disclosure described herein can be performed by software and/or firmware (e.g., computer executable instructions), hardware, application modules, and the like, executable and/or resident on systems, ASICs, and devices shown herein or otherwise. The embodiments of the present disclosure are not limited to any particular operating environment or to instructions written in any particular programming language. Software, firmware, and/or processing modules, suitable for carrying out embodiments of the present disclosure, can be resident in one or more devices or locations. Processing modules can include separate modules connected together or several modules on an application specific integrated circuit (ASIC).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the disclosure require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system for selecting a field service entity for computer hardware installation and servicing at a job site comprising:
   a processor;
   a memory, connected to the processor;

a program access point having access to one or more application interfaces; and program instructions storable in the memory and executable by the processor to control access to the program access point according to hierarchal account levels provided specifically to a first Tier entity (Tier 1) that is an Original Equipment Manufacturer (OEM) in the field of computer hardware installation, a second Tier entity (Tier 2) that is a manager for the OEM, a sixth Tier entity (Tier 6) that is a computer hardware installation technician, and a service staff of an organization operating the program access point and to specifically not provide access to the program access point by a third Tier entity and/or fourth Tier entity (Tier 3 and Tier 4), the third Tier entity or fourth Tier entity being a regional, statewide and/or municipal contractor and/or management company, the program instructions executed by the processor to control access through the program access point to:

receive information from a first entity that is a Tier 1 and/or Tier 2 entity regarding a particular set of attributes of a second entity that is a Tier 6 entity, a set of computer hardware installation field services to be performed by the second entity, and a predetermined compensation to be paid by the first entity to the second entity for the field services in connection with installing and servicing computer hardware at the job site, without the intervention of Tier 3 or Tier 4 entities;

transmit a communication to a second entity that contains the particular set of attributes, the set of field services to be performed, and the predetermined compensation;

identify a number of second entities, who are field service technicians, to perform the set of field services by matching a number of the particular set of attributes received from the first entity;

receive a selection from the first entity of at least one of the number of second entities;

store attributes of a number of individual field service technicians as second entities;

qualify at least one of the number of second entities, wherein qualifying at least one of the second entities includes:
using a training module having instructions executed by the processor to provide training materials to the at least one of the number of second entities;
using a testing module having instructions executed by the processor to provide testing materials to and to receive testing response input from the at least one of the number of second entities; and
using a knowledge base module interconnected to the training module and testing module and having instructions executed by the processor to maintain an online library of a number of service manuals for products of manufacturers and to provide access to the same to the at least one of the number of second entities, the knowledge base module further having instructions executed by the processor to automatically and online update the training module and the testing module upon an update to the knowledge base module;

offer a particular contractual opportunity having a predetermined compensation arrangement to the number of individual field service technicians;

register interest in the particular contractual opportunity by at least one individual field service technician, wherein the program instructions are executed to register tacit agreement to the predetermined compensation arrangement when a second entity accesses further information through the hierarchal account levels of the program access point in response to the offer;

award a contract to a qualified individual field service technician based on interest in the particular contractual opportunity and on stored attributes matching a number of attributes submitted by a client, which include a predetermined compensation to be paid by the client to the qualified individual field service technician;

receive a confirmation that the qualified individual field service technician intends to perform a service for the predetermined compensation at a particular time, day of week, and date;

determine electronically that the confirmation from the qualified individual field service technician is absent a particular number of hours before the service is to be performed and selecting another field service technician from a preselected backup group of qualified field service technicians;

communicate electronically to the qualified backup field service technician and confirming electronically availability of the qualified backup field service technician to perform the service;

coordinate and confirm delivery of tool shipment electronically on line in order to ensure that the tools are present and received at the job site to perform the set of field services at the job site by the first entity;

rate attributes and performance level of the number of second entities by the number of second entities, to allow the second entities to self-rate, and other system users including, the service staff of the organization operating the program access point, the Tier 1 and/or Tier 2 entity, and a recipient of services provided by the number of second entities, the recipient including a customer of the Tier 1 and/or Tier 2 entity;

verify certification, document bonding and insurance, and identify whether any of the number of second entities have a conviction for committing a particular crime, and publish results from verifying certification, document bonding and insurance and conviction information to the first entity;

statistically model, for a Tier 1 and Tier 2 entity, a cost, a value, and a risk of contracting for services that utilize the number of second Tier 6 entities relative to a particular set of field services;

record, for the particular set of field services, the number of second Tier 6 entities, the Tier 5 manager of services provided, the recipient of services that is the customer of the Tier 1 and/or Tier 2 entity, and the service staff of the organization operating the program access point;

record, for the particular set of field services, the time spent doing the services provided, wherein the number of second entities can access the system electronically online to record the same, based on the hierarchal account levels through the program access point;

record, for the particular set of field services, accounting information including payroll records, total past compensation made to the number of second entities for services provided, in order to assess use of the a given second entity and balance workload and payments fairly between the number of second entities, and past pending compensation due, and payment of waybills for parts shipment, to ensure that payment for tools and equipment are covered, wherein the instructions are executed by the processor such that the recorded accounting information can be accessed by the number of second entities, the service staff of the organization operating the program access point, and the Tier 1 and/or Tier 2 entity electronically online, through the program access point based on the hierarchal account levels;

present online to the Tier 5 and Tier 6 entities through one of the viewable interfaces, accessed through the program access point based on the hierarchal account levels, the recorded accounting information, including the tool shipment and a real time status of past payments to the Tier 5 or Tier 6 entity to date;

present online to the Tier 5 and Tier 6 entities through one of the viewable interfaces, accessed through the program access point based on the hierarchal account levels, scheduled positions, requested job site positions, and available sites section; and present online to the Tier 1 and Tier 2 entities through one of the viewable interfaces, accessed through the program access point based on the hierarchal account levels, a project summary for the job site to view a site status, including Tier 6 backup information and details on the Tier 6 entity, wherein program instructions associated with the viewable interface can be executed to allow the Tier 1 and Tier 2 entity to:

change a status of a project at the job site;

create a new job site;

exchange job site comments between the Tier 1 and Tier 2 entity with the Tier 6 entity; and search for Tier 6 field service technicians for a particular job site according to previous contract agreements with the Tier 1 and Tier 2 entity, field service categories, Tier 6 entity tools, and Tier 6 entity certification.

2. The system of claim 1, wherein the instructions executable to identify a number of second entities use particular log-in information submitted when accessing the transmitted communication that enables correlation with a number of the attributes received from the first entity.

3. The system of claim 1, wherein the selection from the number of second entities is determined by the first entity to be qualified to perform the set of field services.

4. The system of claim 1, including instructions executable to transmit to the first entity information about attributes of the identified number of second entities to enable selection by the first entity.

5. The system of claim 1, wherein the instructions executable to transmit the communication regarding the predetermined compensation include setting the compensation based on one selected from the group including:

a type of field service provided;

a particular field service completed;

a daily rate; and an hourly rate calculation.

6. The system of claim 1, wherein the instructions executable to transmit the communication to the second entity include transmitting to one selected from the group including:

a pre-registered second entity;

a second entity that has been pre-qualified by the first entity; and an unselected set of second entities.

7. A system to fulfill field service requirements, comprising:

a server computer including a program access point and access to a data store having one or more user files containing attribute information, wherein the server includes a processor that executes program instructions, wherein particular program instructions executed by the processor are organized into defined modules, segmented to perform certain tasks, wherein program instructions are executed by the processor to control access to each defined module through the program access point according to hierarchal account levels provided specifically to a first Tier entity (Tier 1) that is an Original Equipment Manufacturer (OEM) in the field of computer hardware installation, a second Tier entity (Tier 2) that is a manager for the OEM, a sixth Tier entity (Tier 6) that is a computer hardware installation technician, and a service staff of an organization operating the program access point, but do not provide access from a third Tier entity and/or fourth Tier entity (Tier 3 and Tier 4), the third Tier entity or fourth Tier entity being a regional, statewide and/or municipal contractor and/or management company, wherein the modules including program instructions segmented to perform certain tasks, and accessed through the program access point, include:

a project management module having instructions executed by the server to select, without involvement from the Tier 3 and/or Tier 4 entity, a first particular user, that is the Tier 5 entity or the Tier 6 computer hardware installation technician, with a first skill level ability and an associated first predetermined compensation to be paid in connection with performing a particular project by correlating attribute information for the first particular user with requirements for the particular project determined by the Tier 1 or Tier 2 entity, wherein the project management module includes instructions that are executed to:

present online to the Tier 5 and Tier 6 entities through one or more viewable interfaces, accessed through the program access point based on the hierarchal account levels, recorded accounting information, including a tool shipment and a real time status of past payments to the Tier 5 or Tier 6 entity to date;

present online to the Tier 5 and Tier 6 entities through one of the viewable interfaces, accessed through the program access point based on the hierarchal account levels, scheduled positions, requested job site positions, and available sites section; and present online to the Tier 1 and Tier 2 entities through one of the viewable interfaces, accessed through the program access point based on the hierarchal account levels, a project summary for the job site to view a site status, including Tier 6 backup information, and details on the Tier 6 entity, wherein program instructions associated with the viewable interface can be executed to allow the Tier 1 and Tier 2 entity to:

change a status of a project at the job site;

create a new job site;

exchange job site comments between the Tier 1 and Tier 2 entity with the Tier 6 entity; and search for Tier 6 field service technicians for a particular job site according to previous contract agreements with the Tier 1 and Tier 2 entity, field service categories, Tier 6 entity tools, and Tier 6 entity certification;

a service call module having instructions executed by the server to select a second particular user with a second skill level ability different from the first particular user and an associated second predetermined compensation to be paid in connection with performing a particular service within a specified time frame at a particular location by correlating attribute information for the second particular user with requirements for the particular service call;

a training module having instructions executed by the server to provide training materials to the first and second particular users;

a testing module having instructions executed by the server to provide testing materials to and to receive testing response input from the first and second particular users;

a knowledge base module interconnected to the training module and testing module and having instructions executed by the server to maintain an online library of a number of service manuals for products of manufacturers, and provide access to the same for the first and second particular users, the knowledge base module further having instructions executed by the server to automatically update the training module and the testing module upon an update to the knowledge base module;

wherein, the server includes a ratings module having instructions executed by the server to allow attributes and performance level of a particular user to be rated by at least one of the particular user, an administrator of the server, a staff member of an organization operating the server, a manager of services provided by the particular user, and a recipient of services provided by the particular user;

wherein, the server includes a quality assurance module having instructions executed by the server to verify certification, document bonding and insurance, and identify whether a particular user has a conviction for committing a particular crime, and wherein the quality assurance module includes instructions executed by the server to publish results from verifying certification, document bonding and insurance and conviction information to a tier 1 and tier 2 user of the system;

wherein, the server includes a resource and sales forecast module having instructions executed by the server to statistically model a cost, a value, and a risk of contracting for services that utilize the particular user relative to a particular set of field services;

wherein, the server includes a parts management module having instructions executed by the server to order, register delivery, and register return of parts with requirements of the particular project, a service call, and the particular user in association with the particular project; and wherein, the server includes an accounting module having instructions executed by the server to:

record, for the particular project, the particular user, the manager of services provided, the recipient of services, the administrator of the server, and a client of the server;

record, for the particular project, an actual amount of time spent performing work for the particular project, wherein the instructions are executed to control access through the program access point based on the hierarchal account levels such that the Tier 5 and Tier 6 entity can access a viewable interface of the accounting module electronically online to record the actual amount of time spent performing the work for the particular project; and record, for the particular project, compensation made to the Tier 5 and Tier 6 entity for the particular project and pending compensation, wherein the instructions are executed to control access through the program access point based on the hierarchal account levels such that the Tier 1 and Tier 2 entity can access the viewable interface of the accounting module to see total compensation for the particular project.

8. The system of claim 7, wherein:
the server includes access to a data store having one or more user files wherein the first particular user and the second particular user are each an individual provider of a particular set of field services.

9. The system of claim 7, the server storing a particular requirement of a project, wherein the project includes at least one requirement selected from the group including a number of users having a number of attribute sets and a number of users to be utilized at a number of project locations.

10. A non-transitory computer-usable medium having computer-readable instructions stored thereon and executed by a processor to:

provide a program access point having access to one or more application interfaces, wherein the instructions are executed to control access to the program access point according to a hierarchal account levels provided specifically to a first Tier entity (Tier 1) that is an Original Equipment Manufacturer (OEM) in the field of computer hardware installation, a second Tier entity (Tier 2) that is a manager for the OEM, a sixth Tier entity (Tier 6) that is a computer hardware installation technician, and a service staff of an organization operating the program access point, but do not provide access to a third Tier entity and/or fourth Tier entity (Tier 3 and Tier 4), the Tier 3 or Tier 4 entity being a regional, statewide and/or municipal contractor and/or management company, wherein the instructions are executed by the processor to control access through the program access point to:

store attributes of a number of individual technicians;

qualify the number of individual technicians, wherein qualifying the number of individual technicians includes executing instructions to:

provide online training materials to the number of individual technicians;

provide online testing materials to and receiving online testing response input from the number of individual technicians;

interconnect the online training materials and online testing materials to an online library having a number of service manuals for products of manufacturers; and automatically update the online training materials and the online testing materials upon an update to the online library;

offer a particular contractual opportunity having a predetermined compensation arrangement to the number of individual technicians;

register interest in the particular contractual opportunity by at least one individual technician;

award a contract to a first qualified individual technician based on interest in the particular contractual opportunity and on stored attributes matching a number of attributes submitted by a client, which include a predetermined compensation to be paid by the client to the first qualified individual technician;

receive a confirmation that the qualified individual technician intends to perform a service for the predetermined compensation at a particular time, day of week, and date;

determine electronically that the confirmation from the qualified individual technician is absent a particular number of hours before the service is to be performed and selecting another technician from a preselected backup group of qualified technicians;

confirm electronically the availability of the backup to perform the field service a particular number of hours before the service is to be performed;

coordinate and confirm delivery of tools to perform the set of field services to a field services site by the first entity;

rate attributes and performance level of the number of second entities user by the number of second entities, an administrator of the system, a staff member of an organization operating the system, a manager of services provided by the number of second entities, and a recipient of services provided by the number of second entities;

verify certification, document bonding and insurance, and identify whether any of the number of second entities have a conviction for committing a particular crime, and publish results from verifying certification, document bonding and insurance and conviction information to the first entity;

statistically model a cost, a value, and a risk of contracting for services that utilize the number of second entities relative to a particular set of field services;

record, for the particular set of field services, Tier 1, Tier 2, Tier 5 and Tier 6 entities involved;

record, for the particular set of field services, an actual amount of time spent performing work for the particular set of field services, wherein the number of second entities can access the system electronically online to record the actual amount of time spent performing work for the particular set of field services;

record, for the particular set of field services, accounting information including payroll records, compensation made to the number of second entities for services provided and pending compensation due, and payment of waybills for parts shipment, wherein the instructions are executed by the processor such that the recorded accounting information can be accessed by the number of second entities, the administrator of the server, and the client of the server electronically online;

present online to the Tier 5 and Tier 6 entities through one or more viewable interfaces, accessed through the program access point based on the hierarchal account levels, the recorded accounting information, including the tool shipment and a real time status of past payments to the Tier 5 or Tier 6 entity to date;

present online to the Tier 5 and Tier 6 entities through one of the viewable interfaces, accessed through the program access point based on the hierarchal account levels, scheduled positions, requested job site positions, and available sites section; and present online to the Tier 1 and Tier 2 entities through one of the viewable interfaces, accessed through the program access point based on the hierarchal account levels, a project summary for the job site to view a site status, including Tier 6 backup information, and details on the Tier 6 entity, wherein program instructions associated with the viewable interface can be executed to allow the Tier 1 and Tier 2 entity to:
change a status of a project at the job site;
create a new job site;
exchange job site comments between the Tier 1 and Tier 2 entity with the Tier 6 entity; and
search for Tier 6 field service technicians for a particular job, site according to previous contract agreements with the Tier 1 and Tier 2 entity, field service categories, Tier 6 entity tools, and Tier 6 entity certification.

11. The medium of claim 10, wherein communicating includes sending information using digital and analog technologies, landline and mobile technologies, telephone technologies, radio technology, electronic messaging technology, fiber optic technology, and intranet and internet communications via modem, cable, wireless, and satellite technologies.

12. The medium of claim 10, wherein registering interest can be accomplished by at least one selected from the group including affirmatively responding to a query about such interest, accessing a link present in the electronic communication, and requesting further information about the particular contractual opportunity.

13. The medium of claim 10, wherein:
communicating a particular contractual opportunity and registering interest therein is accomplished by providing a graphic user interface on a platform allowing a real time status management display for use by the individual technician; and
providing a graphic user interface allows viewing by the technician of accounting information including payroll records, payment of waybills for parts shipment, and other financial matters related to performing the contract.

14. A method for supplying technicians, comprising:
coordinating, by a processor in a computing apparatus, a filling of field service requirements with appropriate technicians directly between a Tier 1 and Tier 2 field service entities and a Tier 5 and 6 field service entities without involvement of Tier 3 and 4 field service entities by:
controlling access to a program access point according to a hierarchal account levels provided specifically to a first Tier entity (Tier 1) that is an Original Equipment Manufacturer (OEM) in the field of computer hardware installation, a second Tier entity (Tier 2) that is a manager for the OEM, a sixth Tier entity (Tier 6) that is a computer hardware installation technician, and a service staff of an organization operating the program access point, but do not provide access to a third Tier entity and/or fourth Tier entity (Tier 3 and Tier 4), the third Tier entity or fourth Tier entity being a regional, statewide and/or municipal contractor and/or management company, and the program instructions executed by the processor to allow access through the program access point to perform a method of:
receiving a particular set of desired attributes of a technician and a test of knowledge pertaining to at least one of the desired attributes from a prospective contracting party in order to pre-qualify a subset of technicians;
allowing an unselected group of technicians access to the particular set of desired attributes and the test of knowledge;
providing training to a particular field service relating to the at least one of the desired attributes to individual technicians from the unselected group;
testing knowledge to a particular field service and related to the at least one of the desired attributes possessed by the individual technicians from the unselected group, wherein providing training and testing knowledge includes;
  interconnecting online training materials and online testing materials to an online library having a number of service manuals for products of manufacturers;
  automatically updating the online training materials and the online testing materials upon an update to the online library; and
  restricting a technician who does not pass a test to connecting to a training module for subjects incorrectly answered for further training before being allowed access to repeat a particular test;
correlating with the prospective contracting party and selecting a number of individual technicians to be in the pre-qualified subset based on having at least a minimum level of knowledge relating to the particular set of desired attributes at least partially determined by passing the test of knowledge pertaining to the at least one of the desired attributes;
awarding a contract to a first qualified individual technician based on interest in the particular contractual opportunity and on stored attributes matching a number of attributes submitted by a client, which include a predetermined compensation to be paid by the client to the first qualified individual technician;
receiving a confirmation that the qualified individual technician intends to perform the particular field service for the predetermined compensation at a particular time, a day of week, and a date;
determining electronically that the confirmation from the qualified individual technician is absent a particular number of hours before the service is to be performed and selecting another technician from a pre-selected backup group of qualified technicians;
communicating electronically to the qualified backup technician and confirming electronically availability of the backup to perform the service;
presenting online to the Tier 5 and Tier 6 entities through one of the viewable interfaces, accessed through the program access point based on the hierarchal account levels, the recorded accounting information, including the tool shipment and a real time status of past payments to the Tier 5 or Tier 6 entity to date;
presenting online to the Tier 5 and Tier 6 entities through one of the viewable interfaces, accessed through the program access point based on the hierarchal account levels, scheduled positions, requested job site positions, and available sites section; and
presenting online to the Tier 1 and Tier 2 entities through one of the viewable interfaces, accessed through the program access point based on the hierarchal account levels, a project summary for the job site to view a site status, including Tier 6 backup information, and details on the Tier 6 entity, wherein program instructions associated with the viewable interface can be executed to allow the Tier 1 and Tier 2 entity to perform a method of:
  changing a status of a project at the job site;
  creating a new job site;
  exchanging job site comments between the Tier 1 and Tier 2 entity with the Tier 6 entity; and
  searching for Tier 6 field service technicians for a particular job site according to previous contract agreements with the Tier 1 and Tier 2 entity, field service categories, Tier 6 entity tools, and Tier 6 entity certification.

15. The method of claim 14, wherein training is performed by providing one selected from the group including a combined audio and video teaching aid, an audio teaching aid, and a video teaching aid.

16. The method of claim 14, wherein the method includes executing instructions to specify a particular proximity of the technician to an intended field service site and a certification to perform an intended field service.

* * * * *